US011818806B2

(12) United States Patent
Kumar et al.

(10) Patent No.: US 11,818,806 B2
(45) Date of Patent: Nov. 14, 2023

(54) ML MODEL TRAINING PROCEDURE

(71) Applicant: QUALCOMM Incorporated, San Diego, CA (US)

(72) Inventors: Rajeev Kumar, San Diego, CA (US); Eren Balevi, San Diego, CA (US); Taesang Yoo, San Diego, CA (US); Xipeng Zhu, San Diego, CA (US); Gavin Bernard Horn, La Jolla, CA (US); Shankar Krishnan, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 17/323,242

(22) Filed: May 18, 2021

(65) Prior Publication Data

US 2022/0377844 A1 Nov. 24, 2022

(51) Int. Cl.
*H04W 16/22* (2009.01)
*H04W 88/08* (2009.01)
*G06N 20/00* (2019.01)
*G06F 18/214* (2023.01)

(52) U.S. Cl.
CPC .......... *H04W 88/08* (2013.01); *G06F 18/214* (2023.01); *G06N 20/00* (2019.01)

(58) Field of Classification Search
CPC ...... G06F 18/214; G06N 20/00; G06N 20/20; H04L 41/042; H04L 41/0876; H04L 41/145; H04L 41/16; H04L 41/40; H04L 41/5058; H04L 67/51; H04W 4/60; H04W 8/00; H04W 8/18; H04W 24/02;
(Continued)

(56) References Cited

U.S. PATENT DOCUMENTS

2020/0134374 A1* 4/2020 Oros ..................... G06F 8/71
2021/0160149 A1* 5/2021 Ma ..................... H04L 41/0803
2021/0325861 A1* 10/2021 Hou ................. G05B 19/41885
(Continued)

OTHER PUBLICATIONS

Samsung, Summary of Offline Discussion on High-Level Principles and Definitions, 3GPP TSG-RAN WG3 #110-e, R3-206873, 10 pages, Jun. 12, 2020.*
(Continued)

*Primary Examiner* — Frank Duong
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for an ML model training procedure. A network entity may receive a trigger to activate an ML model training procedure based on at least one of an indication from an ML model repository or a protocol of the network entity. The network entity may transmit an ML model training request to activate the ML model training at one or more nodes. The one or more nodes may be associated with a RAN that may transmit, based on receiving the ML model training request, ML model training results indicative of a trained ML model. In aspects, an apparatus, such as a UE, may train the ML model based on an ML model training configuration received from the RAN, and transmit an ML model training report indicative of the trained ML model.

30 Claims, 22 Drawing Sheets

(58) Field of Classification Search
CPC ..... H04W 48/16; H04W 48/18; H04W 60/04; H04W 72/12; H04W 88/08
See application file for complete search history.

(56) References Cited

U.S. PATENT DOCUMENTS

| | | | | |
|---|---|---|---|---|
| 2022/0116764 | A1* | 4/2022 | Pezeshki | H04W 8/22 |
| 2022/0279341 | A1* | 9/2022 | Tomala | G06N 20/00 |
| 2022/0286927 | A1* | 9/2022 | Madadi | H04W 36/00837 |
| 2022/0287104 | A1* | 9/2022 | Jeon | G06N 20/00 |
| 2022/0321647 | A1* | 10/2022 | Berggren | H04W 8/22 |
| 2022/0338189 | A1* | 10/2022 | Madadi | H04B 7/0626 |
| 2022/0360973 | A1* | 11/2022 | Zhu | H04W 76/25 |
| 2023/0004864 | A1* | 1/2023 | Wang | G06N 20/00 |

OTHER PUBLICATIONS

Lenovo, Motorola Mobility, KI#1 Sol#5: Additional clarifications on sharing AI models to an NWDAF, 3GPP TSG-SA WG2 Meeting #142e, S2-2008944, 6 pages, Nov. 20, 2020.*

5G PPP Technology Board, AI/ML for Networks, AI and ML—Enablers for Beyond 5G Networks, 145 pages, May 11, 2021.*

Intel Corporation, Functional Framework of AI/ML enabled NG-RAN Network, 3GPP TSG-RAN WG3 Meeting #112-e, R3-212299, 5 pages, May 28, 2021.*

Nokia, Nokia Shanghai Bell, AI/ML Architecture Discussion, 3GPP TSG-RAN WG3 Meeting #112-e, R3-212371, 3 pages, May 27, 2021.*

Intel Corporation: "Use Cases for AI/ML Enabled NG-RAN", 3GPP TSG-RAN WG3 Meeting 112-e, R3-212301, 3GPP, Mobile Competence Centre, 650, Route Des Lucioles, F-06921 Sophia-Antipolis Cedex, France, vol. RAM WG3, No. Electronic Meeting, May 17, 2021-May 28, 2021, May 7, 2021, XP052002402, Url: https://ftp.3gpp.org/tsg_ran/WG3_lu/TSGR3_112-e/Docs/R3-212301.zip R3-212301-Use cases for AIML enabled NG-RAN.docx.

International Search Report and Written Opinion—PCT/US2022/025384—ISA/EPO—dated Jun. 22, 2022.

Nokia Shanghai Bell, et al., "Use Case Updates—Clause 7.1", 3GPP TSG-SA WG1 Meeting #93e, S1-210327R3, 3GPP, Mobile Competence Centre, 650, Route Des Lucioles, F-06921 Sophia-Antipolis Cedex, France, vol. SA WG1, No. Electronic Meeting, Feb. 22, 2021-Mar. 4, 2021, 4 Pages, Mar. 15, 2021, XP051987218, Url: https://ftp.3gpp.org/tsg_sa/WG1_Serv/TSGS1_93e_Electronic_Meeting/Docs_revised_number/S1-210327r3.zip S1-210327r3-Use case updates - clause 7_1.doc.

Qualcomm Incorporated: "Model Training Procedure", 3GPP TSG-RAN WG3 Meeting #112-e, R3-211755, 3GPP, Mobile Competence Centre, 650, Route Des Lucioles, F-06921 Sophia-Antipolis Cedex, France, vol. RAN WG3, No. May 17, 2021-May 28, 2021, 3 Pages, May 7, 2021, XP052002038, Retrieved front the Internet: URL: https://ftp.3gpp.org/tsg_ran/WG3_lu/TSGR3_112-e/Docs/R3-211755.zip R3-211755 Model training procedure.doc.

* cited by examiner

ML MODEL TRAINING PROCEDURE

TECHNICAL FIELD

The present disclosure relates generally to communication systems, and more particularly, to a machine learning (ML) model training procedure.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive a trigger to activate a machine learning (ML) model training based on at least one of an indication from an ML model repository or a protocol of the network entity; and transmit an ML model training request to activate the ML model training at one or more nodes.

In another aspect of the disclosure, a method, a computer-readable medium, and an apparatus are provided. The apparatus may receive a ML model training request initiated based on at least one of a first protocol of an ML model repository or a second protocol of a network entity; and transmit, based on the ML model training request, ML model training results indicative of a trained ML model.

In yet another aspect of the disclosure, a method, a computer-readable medium, and an apparatus are provided. The apparatus may receive an ML model training configuration for training an ML model, the ML model training configuration initiated based on at least one of a first protocol of an ML model repository or a second protocol of a network entity; train the ML model based on the ML model training configuration; and transmit an ML model training report based on the ML model training configuration, the ML model training report indicative of the trained ML model.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
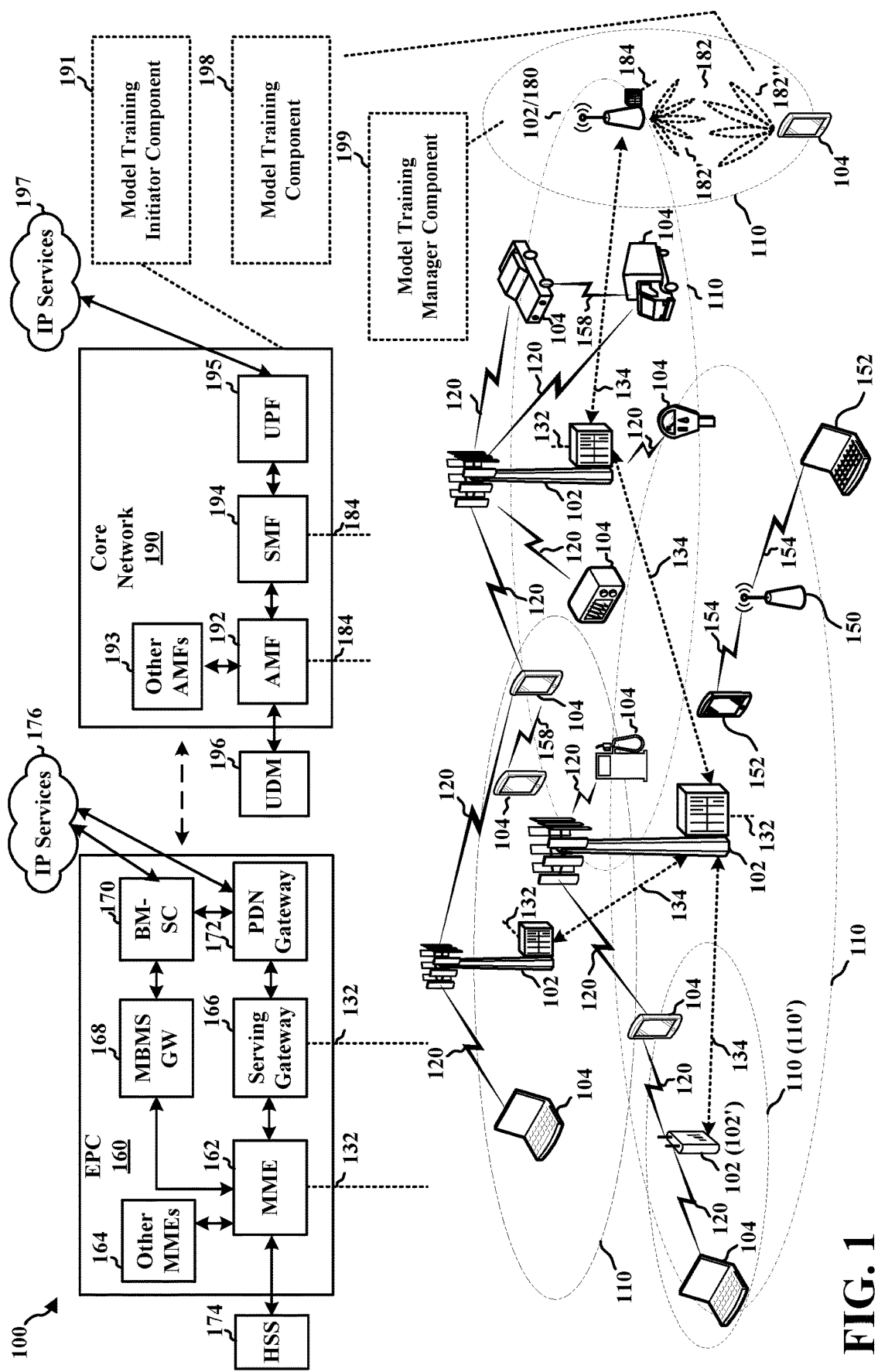
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the core network 190 may include a model training initiator component 191 configured to receive a trigger to activate a machine learning (ML) model training based on at least one of an indication from an ML model repository or a protocol of the network entity; and transmit an ML model training request to activate the ML model training at one or more nodes. In certain aspects, the base station 180 may include a model training manager component 199 configured to receive an ML model training request initiated based on at least one of a first protocol of an ML model repository or a second protocol of a network entity; and transmit, based on the ML model training request, ML model training results indicative of a trained ML model. In certain aspects, the UE 104 and/or the base station 102 (e.g., centralized unit (CU) and/or distributed unit (DU)) may include a model training component 198 configured to receive an ML model training configuration for training an ML model, the ML model training configuration initiated based on at least one of a first protocol of an ML model repository or a second protocol of a network entity; train the ML model based on the ML model training configuration; and transmit an ML model training report based on the ML model training configuration, the ML model training report indicative of the trained ML model. Although the following description may be focused on 5G NR, the concepts described herein may be applicable to other similar areas, such as LTE, LTE-A, CDMA, GSM, and other wireless technologies.

Figure 2:
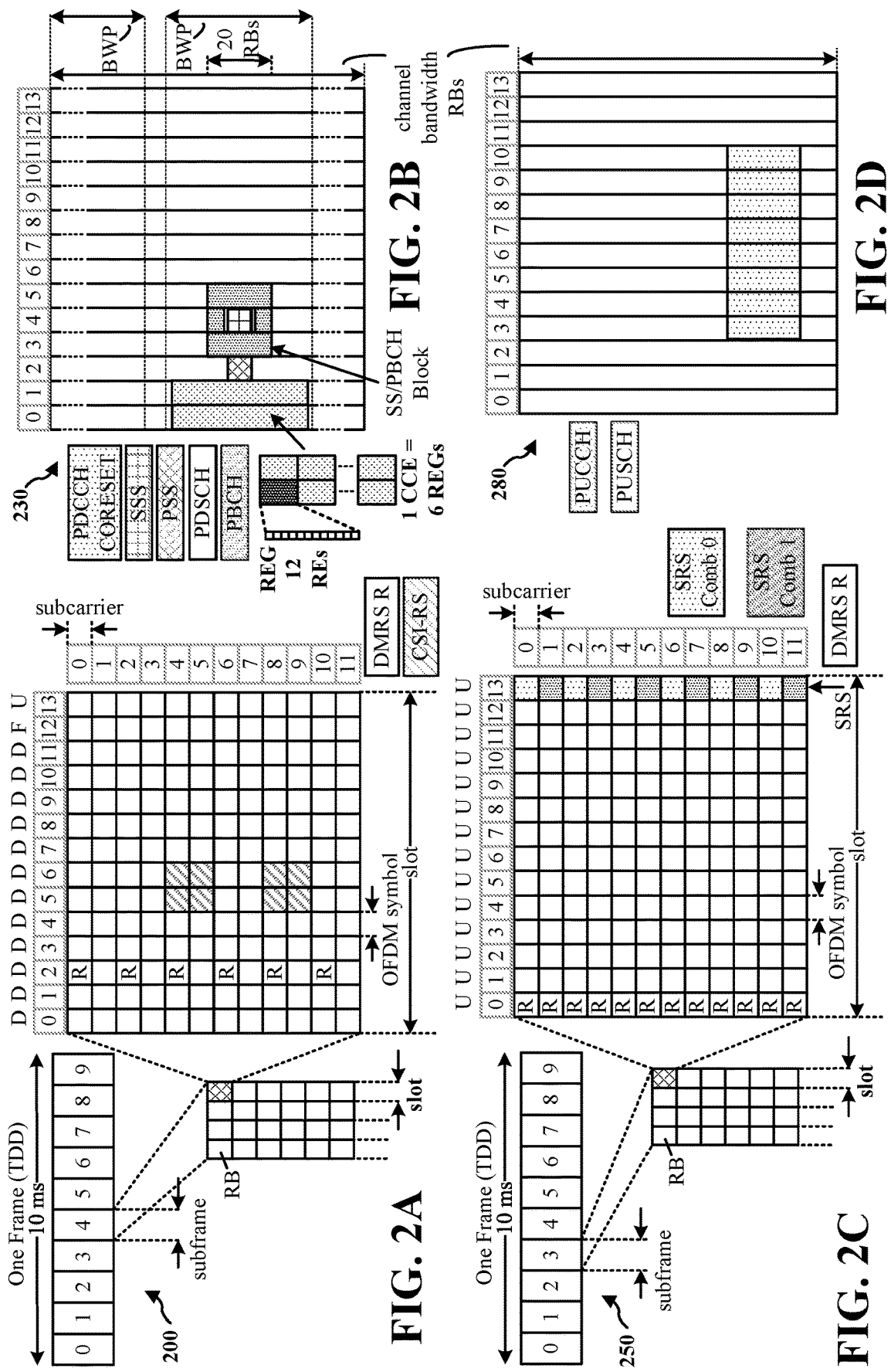
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the cyclic prefix (CP) is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
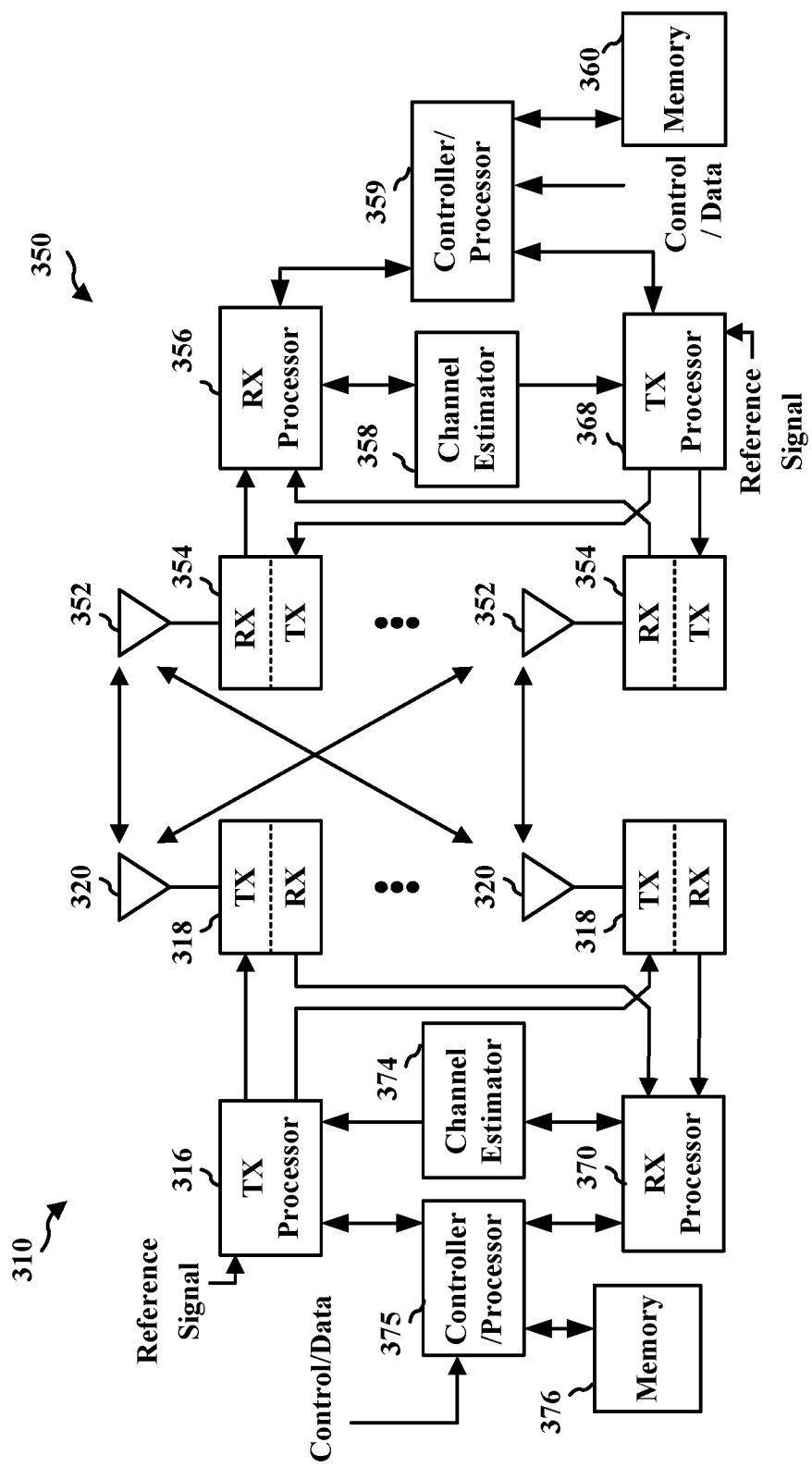
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the model training component 198 of FIG. 1.

At least one of the TX processor 316, the RX processor 370, and the controller/processor 375 may be configured to perform aspects in connection with the model training manager component 199 of FIG. 1.

At least one of the TX processor 316, the RX processor 370, and the controller/processor 375 may be configured to perform aspects in connection with the model training initiator component 191 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

A UE and/or a base station (e.g., CU and/or DU) may use machine-learning algorithms, deep-learning algorithms, neural networks, reinforcement learning, regression, boosting, or advanced signal processing methods for aspects of wireless communication, e.g., with a base station, a TRP, another UE, etc. Reinforcement learning is a type of machine learning that involves the concept of taking actions in an environment in order to maximize a reward. Reinforcement learning is a machine learning paradigm, other paradigms including supervised learning and unsupervised learning. Basic reinforcement may be modeled as a Markov decision process (MDP) having a set of environment and agent states, and a set of actions of the agent. The process may include a probability of a state transition based on an action, and a representation of a reward after the transition. The agent's action selection may be modeled as a policy. The reinforcement learning may enable the agent to learn an optimal, or nearly-optimal, policy that maximizes a reward. Supervised learning may include learning a function that maps and input to and output based on example input-output pairs, which may be inferred from a set of training data, which may be referred to as training examples. The supervised learning algorithm analyzes the training data and provides an algorithm to map to new examples. Regression analysis may include statistical processes for estimating the relationships between a dependent variable (e.g., which may be referred to as an outcome variable) and independent variable(s). Linear regression is one example of regression analysis. Non-linear models may also be used. Regression analysis may include inferring causal relationships between variables in a dataset. Boosting includes one or more algorithms for reducing bias and/or variance in supervised learning, such as machine learning algorithms that convert weak learners (e.g., a classifier that is only slightly correlated with a true classification) to strong ones (e.g., a classifier that is more closely correlated with the true classification). Boosting may include iterative learning based on weak classifiers with respect to a distribution that is added to a strong classifier. The weak learners may be weighted related to accuracy. The data weights may be readjusted through the process. In some aspects described herein, an encoding device (e.g., a UE) may train one or more neural networks to learn dependence of measured qualities on individual parameters.

Figure 22:
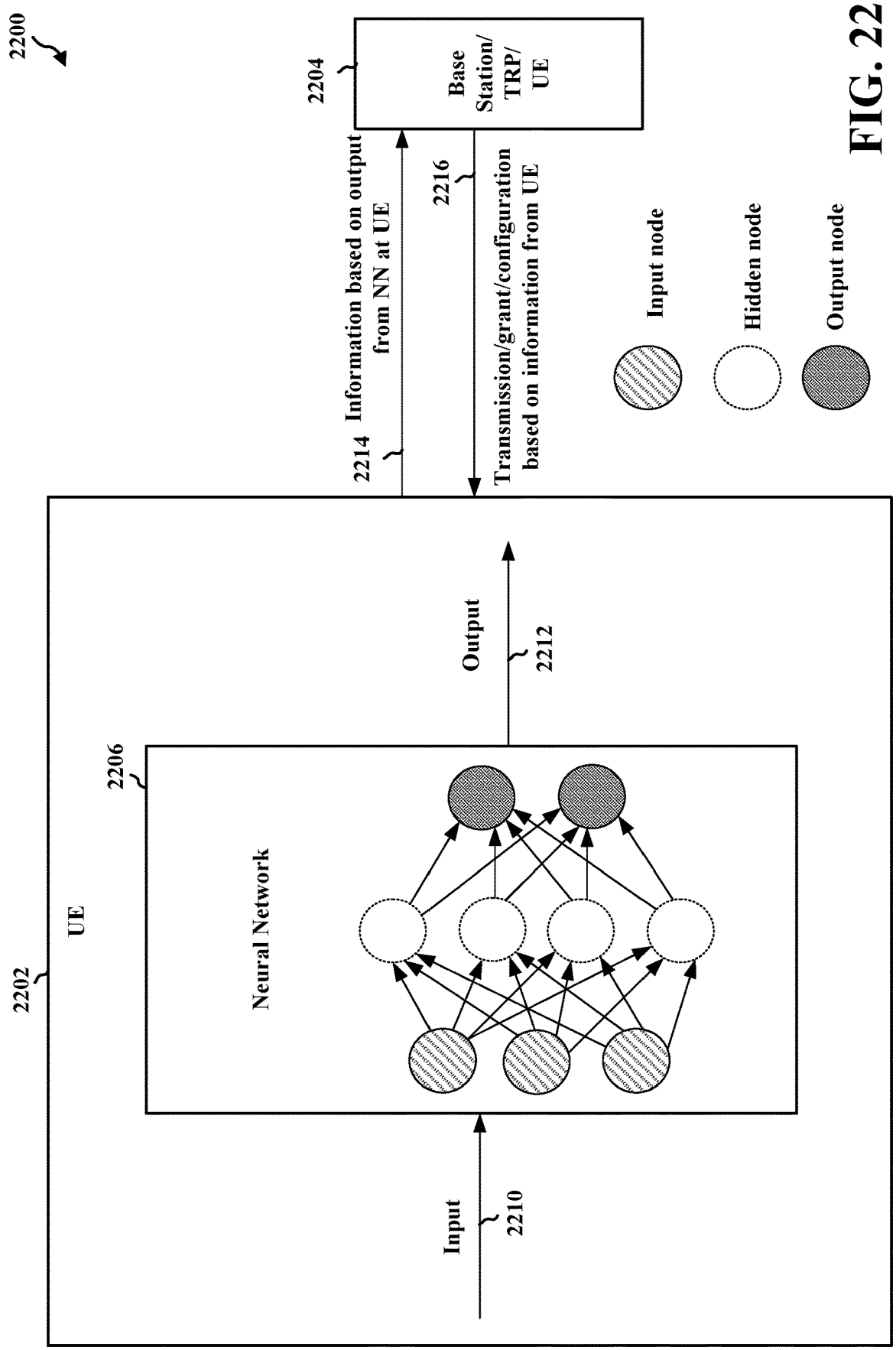
FIG. 22 illustrates example aspects of a neural network that may be employed for machine learning by a wireless device.

FIG. 22 illustrates a diagram 2200 of a UE 2202 that includes a neural network 2206 configured for determining communications with a second device 2204. The second device 2204 may be a base station, in some examples. The second device 2204 may be a TRP in some examples. The second device 2204 may be another UE in some examples, e.g., if the communication between the UE 2202 and the second device 2204 is based on sidelink. Although example aspects of machine learning and a neural network are provided for an example of a UE, the aspects may similarly be applied by a base station, and IAB node, or another training host.

Among others, examples of machine learning models or neural networks that may be comprised in the UE 2202 include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; bayesian networks; genetic algorithms; Deep convolutional networks (DCNs) configured with additional pooling and normalization layers; and Deep belief networks (DBNs).

A machine learning model, such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivates, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. FIG. 22 illustrates that an example neural network 2206 may include a network of interconnected nodes. An output of one node is connected as the input to another node. Connections between nodes may be referred to as edges, and weights may be applied to the connections/edges to adjust the output from one node that is applied as input to another node. Nodes may apply thresholds in order to determine whether, or when, to provide output to a connected node. The output of each node may be calculated as a non-linear function of a sum of the inputs to the node. The neural network 2206 may include any number of nodes and any type of connections between nodes. The neural network 2206 may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse layers multiple times. As an example, the UE may input information 2210 to the neural network 2206, and may receive output 2212. The UE may report information 2214 to the second device 2204 based on the output 2212. In some aspects, the second device may transmit communication to the UE 2202 based on the information 2214. In some aspects, the device 2204 may be a base station that schedules or configures the UE 2202 based on the information 2214, e.g., at 2216. In other aspects, the base station may collect information from multiple training hosts, e.g., from multiple UEs.

Figure 4:
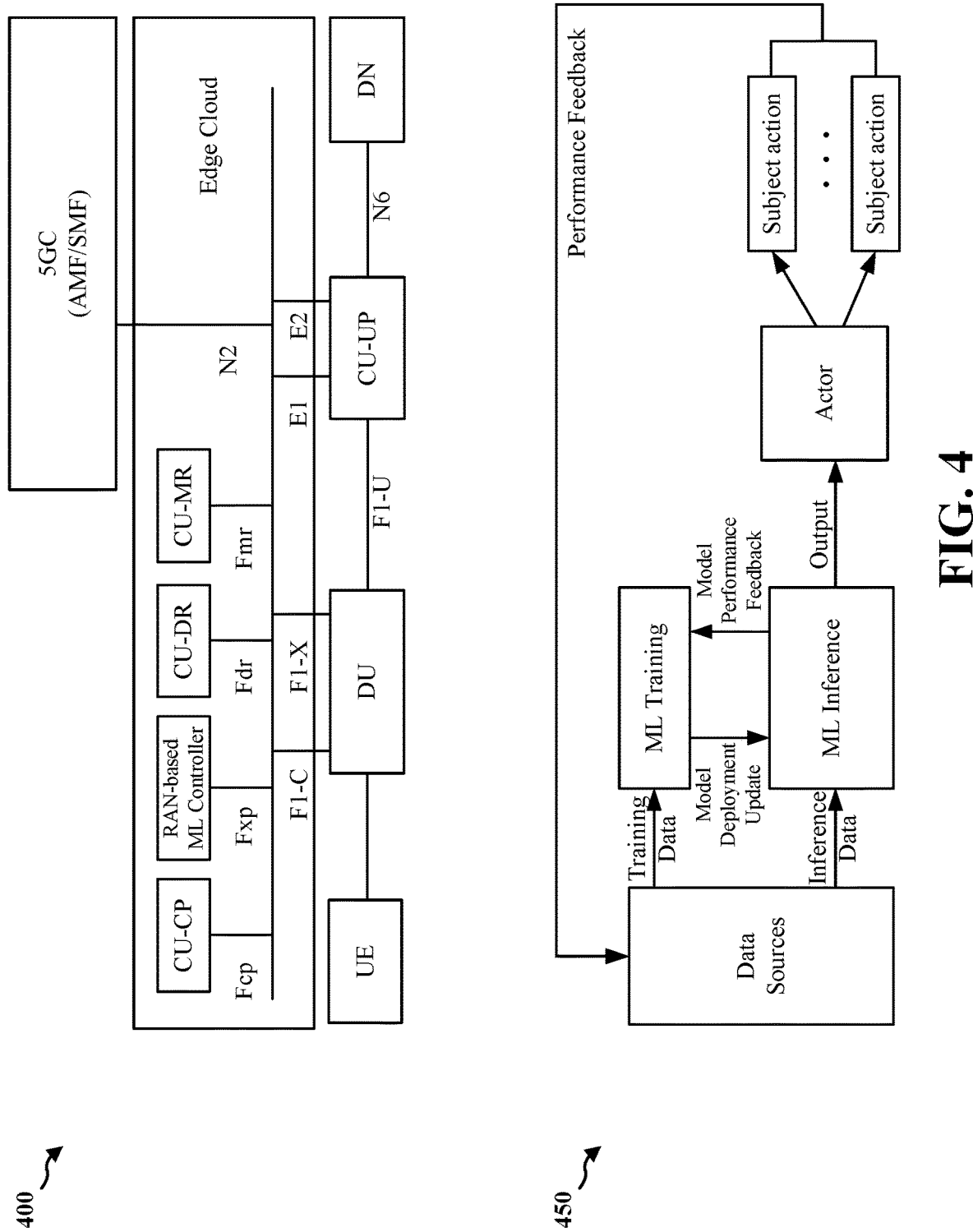
FIG. 4 illustrates diagrams associated with radio access network (RAN) machine learning (ML) architectures.

FIG. 4 illustrates diagrams 400-450 associated with RAN ML architectures. An ML model training procedure may be associated with techniques for a network to transmit a model to a UE and/or for the UE to transmit updated model weights to the network. ML models may be trained prior to executing an ML-based procedure. ML models may also be retained from time-to-time based on updated data. A core network model repository, a RAN CU-model repository (CU-MR), or a third party model repository hosted in an edge cloud at the RAN, etc., may transmit a training request to a network manager based on the status of the ML model. The third party model repository may be a UE vendor model repository. The training request may be based on protocols of an operations, administration, and maintenance (OAM) entity, a base station (e.g., including a RAN-based ML controller), and/or a network data analytics function (NWDAF). The network manager may be a service management and orchestration (SMO)/OAM, base station, NWDAF, etc. The request may be transmitted to a mobile network. In some cases, the training may be performed at the mobile network. In other cases, a configuration may be transmitted from the mobile network to training hosts, which may correspond to network entities (NEs) and/or UEs. The UEs may perform the training and transmit corresponding training data to the network.

In cellular networks, for example, the training may correspond to centralized learning or distributed learning. Centralized learning may refer to training at a single NE, which may include offline learning where the training may be based on pre-collected data, such as historic data, from different NEs/UEs. Centralized learning may also include online learning where training may be based on UE/NE generated/collected real-time data. A training host may be collocated with an inference host. Distributed learning may refer to training at multiple NEs and/or UEs. For example, distributed learning may be based on the different NEs and/or UEs transmitting data indicative of weights/updates to a centralized model repository that may aggregate the weights/updates. An example of distributed learning may include federated learning, which may be similar to centralized/online training, except that the training includes multiple training hosts (e.g., multiple UEs may perform the training by sending weights to a network node that aggregates the weights). For instance, a model manager (e.g., model repository) may aggregate the weights of each training host, which may be in contrast to online learning, where one node may receive/collect the training data. The training data in distributed learning may be processed in a batch or streams based on an availability of storage at the device and the utilized ML training algorithm. For example, the training data may be processed in a batch at the NEs, while the training data may be processed in a stream at the UEs and IoT devices.

In the diagram 400, a RAN ML architecture may include different network entities corresponding to a CU-control plane (CU-CP), a RAN-based ML controller, a CU-data repository (CU-DR), a CU-model repository (CU-MR), a UE-model repository (UE-MR) hosted at the RAN, or a third party model repository, etc. The RAN-based ML controller may be used for controlling an ML-based procedure, such as updating an ML model update rule for the CU-MR, configuring the model training, and/or mode inference at different NEs or UEs. The RAN-based ML controller may perform RAN ML management procedures for ML management at the RAN. The CU-DR may receive/store data from multiple network entities and/or provide model repository functionality. That is, the CU-DR may store and process data at the RAN. Additionally or alternatively, the CU-MR may be used to provide the model repository. The CU-MR may store ML models, maintain a status of the ML models, perform ML weight aggregation based on a configuration received from the RAN-based ML controller, etc. The CU-CP may be used for RAN control functions, and a CU-user plane (CU-UP) may be used for RAN user plane functions.

In the diagram 450, a functional architecture for an ML procedure may be based on an ML training function and an ML inference function. In an example, one or more data sources may receive/store data to be processed for the ML procedure. The ML training function may be executed to perform training based on input training data. The ML inference function may be executed to perform a prediction based on input inference data. A model deployment update may be transmitted from the ML training function to the ML inference function, and model performance feedback may be transmitted from the ML inference function to the ML training function. An output/prediction of the ML inference function may be provided to an actor in the functional architecture associated with the diagram 450 that performs one or more subject actions based on the output/prediction of the ML inference function. An output of the one or more subject actions may correspond to performance feedback transmitted to the data source.

Figure 5:
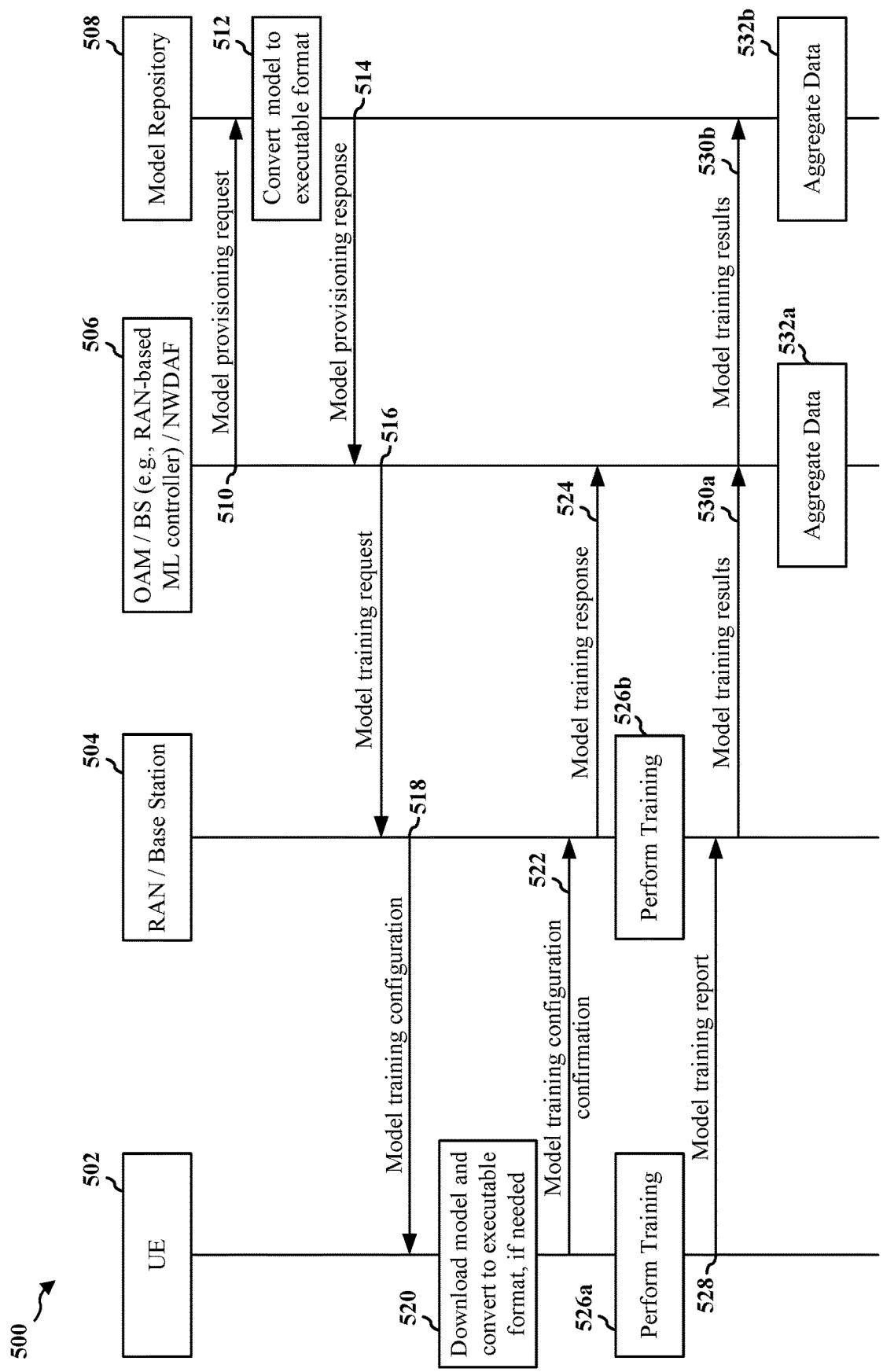
FIG. 5 is a call flow diagram for network-initiated ML model training.

FIG. 5 is a call flow diagram 500 for network-initiated ML model training. The training may be initiated via a network entity 506 correspond to any of an OAM, a base station (e.g., including a RAN-based ML controller), a NWDAF, etc., that transmits, at 510, a model provisioning request to a model repository 508. The model repository 508 may covert, at 512, an ML model into an executable format and transmit, at 514, a model provisioning response to the network entity 506, which may further transmit, at 516, a model training request to a RAN/base station 504. The RAN/base station 504 may transmit, at 518, a model training configuration to a UE 502 based on receiving, at 516, the model training request.

The UE 502 may download, at 520, the ML model from the model repository 508 based on receiving, at 518, the model training configuration from the RAN/base station 504 and convert, at 520, the ML model into an executable, if the ML model is not already configured in a format that is executable by the UE 502. The UE 502 may transmit, at 522, a model training configuration confirmation to the RAN/base station 504, which may further transmit, at 524, a model training response to the network entity 506 based on one or more of the model training request or the model training configuration confirmation. The ML model training may be performed, at 526a, by the UE 502 or, at 526b, by the RAN/base station 504. If the UE 502 performs the training, at 526a, the UE 502 may transmit, at 528, a model training report to the RAN/base station 504. The RAN/base station 504 may transmit, at 530a, model training result to the network entity 506 based on the ML model training performed, at 526a-526b, by one or both of the UE 502 or the RAN/base station 504. The network entity 506 may or may not forward, at 530b, the model training results to the model repository 508 for data aggregation, at either 532a or 532b. That is, the model may then be aggregated, at 532a, via the network entity 506 and/or aggregated, at 532b, via the model repository 508. Alternatively, the model training result may be sent directly to the model repository or model aggregator entity.

The network-initiated ML model training may be performed using a similar framework as minimization of drive test (MDT). The ML model training may be area-specific or UE-specific. An ML function manager (e.g., OAM, RAN-based ML controller, etc.) may initiate the training procedure based on an indication to the RAN/base station 504. The training may be performed by the RAN/base station 504 and/or the UE 502. A UE capability and/or a UE consent/authorization may be determined prior to transmitting a request to the UE 502 to perform the ML model training. The RAN/base station 504 may determine and/or transmit the model training results to a data repository, e.g., model repository 508, which may then perform aggregation and post-processing.

Figure 6:
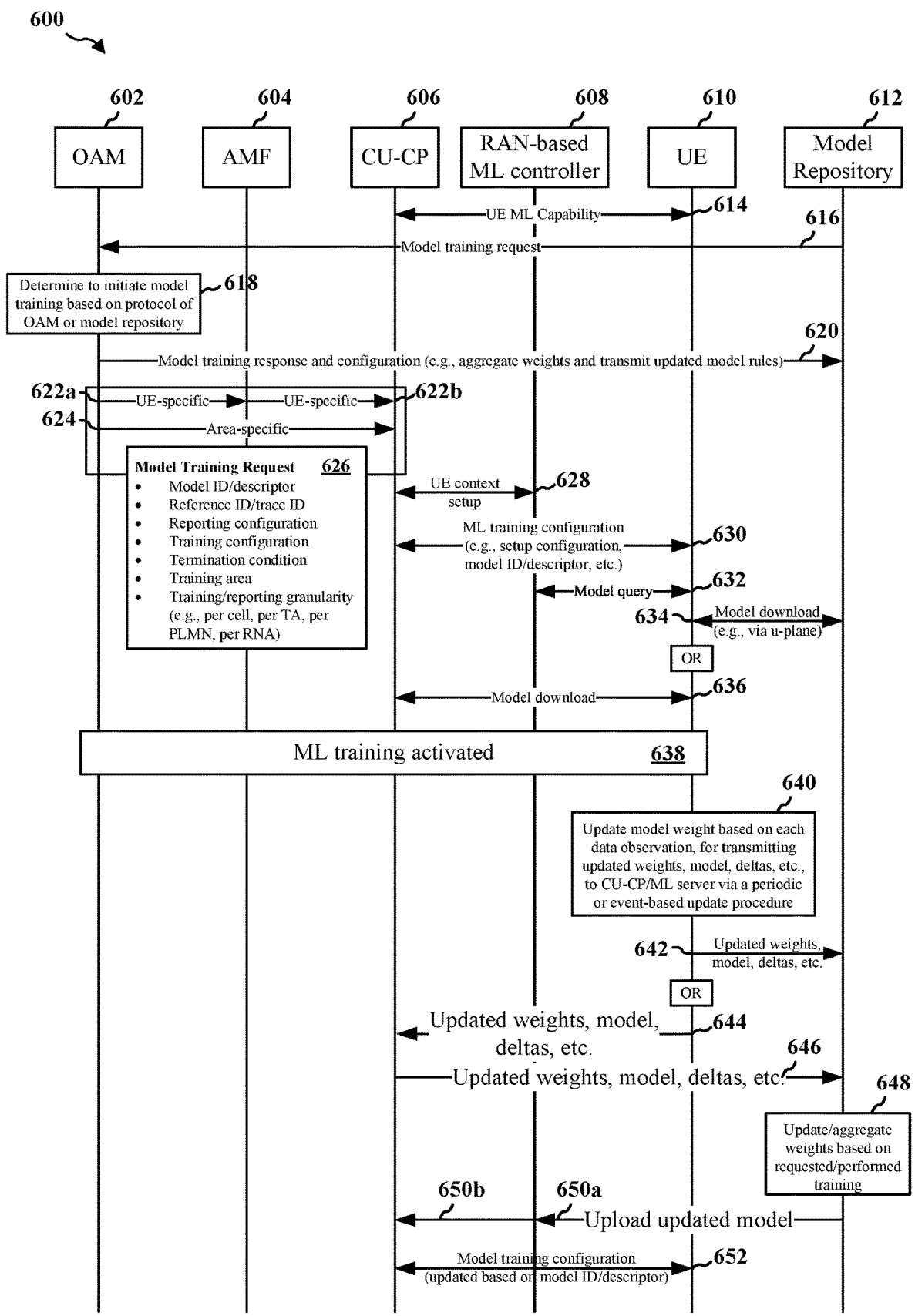
FIG. 6 is a call flow diagram for operations, administration, and maintenance (OAM)-initiated ML model training activation.

FIG. 6 is a call flow diagram 600 for OAM-initiated ML model training activation. OAM-initiated model training may be performed based on available data to the UE 610 or other NE in an RRC connected state. For example, the OAM 602 may determine, at 618, to initiate the model training based on protocols of the OAM 602. The OAM 602 may also determine, at 618, to initiate the model training based on the UE 610 transmitting, at 614, a UE ML capability to the CU-CP 606, and the CU-DR/ML server/model repository 612 transmitting, at 616, the model training request to the OAM 602. The OAM 602 may subsequently transmit, at 620, a model training response and a model training configuration to the model repository 612 (e.g., associated with aggregated weights and/or updated model rules).

The OAM 602 may initiate model training via signaling, at 622a, which may be UE-specific, or management-based procedures, at 624, which may be area-specific, in association with a model training request 626 transmitted to the CU-CP 606. The model training request 626 may include one or more of a model identifier (ID)/descriptor, a reference ID/trace ID, a reporting configuration, a training configuration, a termination condition, a training area, an indication of training/reporting granularity (e.g., per cell, per tracking area (TA), per PLMN, per RAN-based notification area (RNA)), etc. In examples, UE-specific signaling may be transmitted, at 622a, to the AMF 604, which may relay, at 622b, the UE-specific signaling to the CU-CP 606.

The CU-CP 606 may perform, at 628, a UE context setup with the RAN-based ML controller 608 after receiving, at 622b or 624, the UE-specific model training request or the area-specific model training request. The CU-CP 606 may further perform, at 630, an ML training configuration with the UE 610 (e.g., based on a setup configuration, the model ID/descriptor, etc.). After the UE 610 is configured based on the ML training configuration, the UE 610 may perform, at 632, a model query with the RAN-based ML controller 608 to determine a location of the model. For example, the model may be stored at the CU-CP 606 or at the model repository 612. The UE 610 may download, at 634-636, the model over either the user plane (u-plane) or the control plane (c-plane) based on the determined location of the model. ML training may be activated, at 638, after the UE 610 receives, at 634-636, the ML training model.

The UE 610 may update, at 640, model weights based on each data observation at the UE 610 and transmit, at 642-644, the updated weights, model, deltas, etc., to the model repository 612 over the u-plane or to the CU-CP 606 over the c-plane via a periodic or event-based update procedure. An event-based trigger condition may include a number of trainings performed on the model. If the updated weights, model, deltas, etc., are transmitted, at 644, to the CU-CP 606, the CU-CP 606 may relay, at 646, the updated weights, model, deltas, etc., to the model repository 612. The model repository 612 may update/aggregate, at 648, the information based on the requested/performed model training. The updated model may be uploaded, at 650a, in a container to the RAN-based ML controller 608, which may relay, at 650b, the updated model to the CU-CP 606. The CU-CP 606 may transmit, at 652, an updated model configuration to the UE 610 (e.g., based on the update associated with the model ID/descriptor).

A similar procedure may be performed for training at the DU or the CU. That is, the UE 610 may be replaced with the CU or the DU and the procedure may remain the same, except that there would be no initial ML UE capability to transmit, at 614. In examples, the OAM 602 may transmit the training request to multiple base stations, and the CUs/DUs/UEs may report the updated weight, model, deltas, gradients, etc., to the model repository 612. Multiple CU-model repositories (CU-MRs) may report the updated weights, model, deltas, gradients, etc., to a core network model repository, if requested. The OAM 602 may configure the model server with weight update rules. If a plane is not already established with the RAN-based ML controller 608, the base station may establish the plane via a setup configuration, model ID/descriptor, etc. The CU/DU/UE may subsequently download the model and perform the model training.

Figure 7:
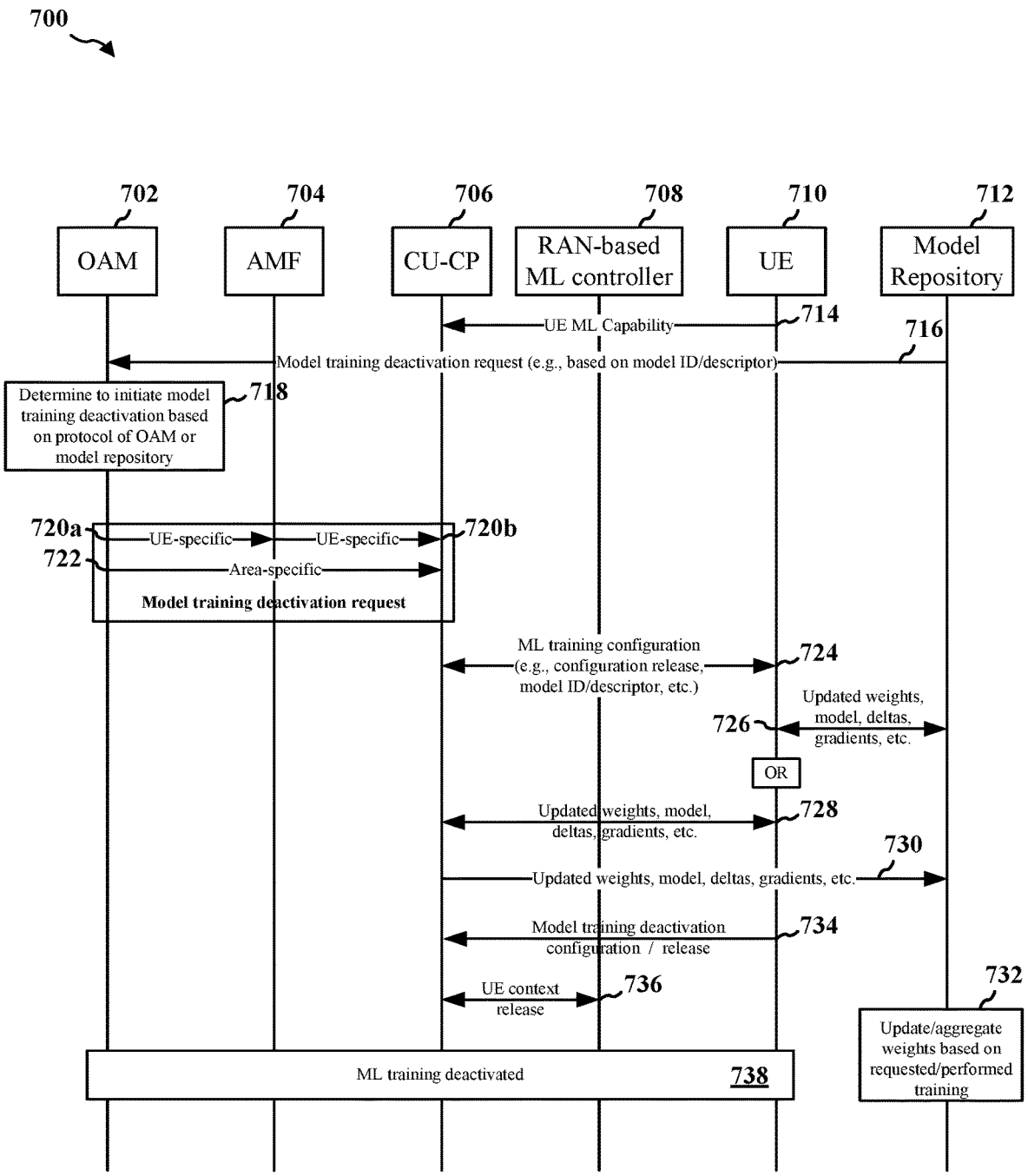
FIG. 7 is a call flow diagram for OAM-initiated ML model training deactivation.

FIG. 7 is a call flow diagram 700 for OAM-initiated ML model training deactivation. OAM-initiated model training deactivation may be performed based on the UE 710 or other NE being configured in an RRC connected state. For example, the OAM 702 may determine, at 718, to initiate deactivation of the model training based on protocols of the OAM 702. The OAM 702 may also determine, at 718, to initiate model training deactivation based on the UE 710 transmitting, at 714, a UE ML capability to the CU-CP 706, and the ML server/CU-DR/model repository 712 transmitting, at 716, a model training deactivation request to the OAM 702 (e.g., based on the model ID/descriptor). The OAM 702 may subsequently transmit a model training deactivation request to the CU-CP 706. The model training deactivation request may be indicated to the CU-CP 706 via UE-specific signaling, at 720a-720b, or an area-specific management-based procedure, at 722. In examples, the UE-specific signaling may be transmitted, at 720a, to the AMF 704, which may relay, at 720b, the UE-specific signaling to the CU-CP 706.

The CU-CP 706 may transmit, at 724, to the UE 710, a corresponding ML training configuration (e.g., based on a configuration release, the model ID/descriptor, etc.). The corresponding ML training configuration may be used for the UE 710 to transmit, at 726-728, the most recently updated weights, model, deltas, gradients, etc., to the model repository 712 over the u-plane, if available, or to the CU-CP 706 over the c-plane, if available. If the most recently updated weights, model, deltas, gradients, etc., are reported/transmitted, at 728, to the CU-CP 706, the CU-CP 706 may relay, at 730, the most recently updated weights, model, deltas, gradients, etc., to the model repository 712.

The model repository 712 may update/aggregate, at 732, the information based on the requested/performed model training. The UE may transmit, at 734, a model training configuration deactivation/release to the CU-CP 706 for deactivating the ML model training, and the CU-CP 706 may perform, at 736, a UE context release with the RAN-based ML controller 708. Based on performing, at 736, the UE context release, the ML training may be deactivated, at 738. If a single model training and inference is configured at the UE 710, the serving CU may determine to release configurations for the plane established with the RAN-based ML controller 708.

Figure 8:
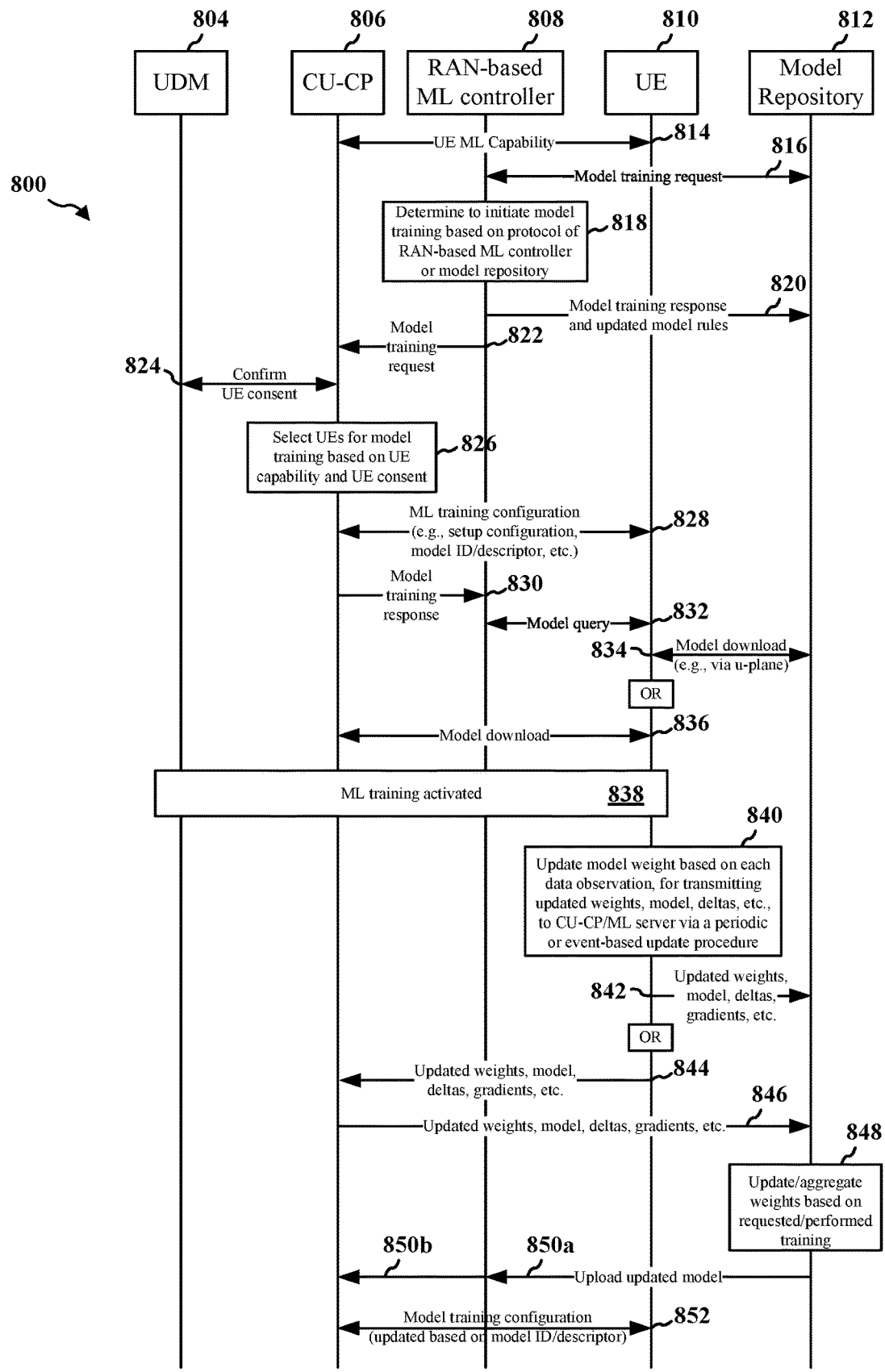
FIG. 8 is a call flow diagram for RAN-based ML controller-initiated ML model training activation.

FIG. 8 is a call flow diagram 800 for RAN-based ML controller-initiated ML model training activation. RAN-based ML controller-initiated model training may be performed in an RRC connected state. For example, the RAN-based ML controller 808 may determine, at 818, to initiate the model training based on protocols of the RAN-based ML controller 808. The RAN-based ML controller 808 may also determine, at 818, to initiate the model training based on the RAN-based ML controller 808 receiving, at 816, a model training request from the model repository 812. The RAN-based ML controller 808 may subsequently transmit, at 820, a model training response and an updated model rule to the model repository 812. The model training request may be further transmitted/relayed, at 822, to the CU-CP 806, which may confirm a UE consent/authorization for selecting UEs for model training, and a UE ML capability. The UE ML capability may be indicated, at 814, from the UE 810 to the CU-CP 806, and the UE consent/authorization may be confirmed, at 824, based on communication with a unified data management (UDM) entity 804. The CU-CP 806 may select, at 826, one or more UEs for model training based on the UE ML capability and the UE consent/authorization.

The CU-CP may transmit, at 828, to the UE 810, an ML training configuration, which may include a setup configuration, a model ID/descriptor, etc. The CU-CP 806 may also transmit, at 830, to the RAN-based ML controller 808, a model training response to the model training request. An ML model query procedure may be performed, at 832, between the UE 810 and the RAN-based ML controller 808 to determine a location of the model. For example, the model may be stored at the CU-CP 806 or at the model repository 812. The UE 810 may download, at 834-836, the model over either the u-plane or the c-plane based on the determined location of the model. ML training may be activated, at 838, after the UE 810 receives the ML training model.

The UE 810 may update, at 840, model weights based on each data observation at the UE 810 and transmit, at 842-844, the updated weights, model, deltas, gradients, etc., to the model repository 812 over the u-plane or to the CU-CP 806 over the c-plane via a periodic or event-based update procedure. An event-based trigger condition may include a number of trainings performed on the model. If the updated weights, model, deltas, gradients, etc., are transmitted, at 844, to the CU-CP 806, the CU-CP 806 may relay, at 846, the updated weights, model, deltas, gradients, etc., to the model repository 812. The model repository 812 may update/aggregate, at 848, the information based on the requested/performed model training. The updated model may be uploaded, at 850a, in a container to the RAN-based ML controller 808, which may relay, at 850b, the updated model to the CU-CP 806. The CU-CP 806 may transmit, at 852, an updated model configuration to the UE 810 (e.g., based on the update associated with the model ID/descriptor).

Figure 9:
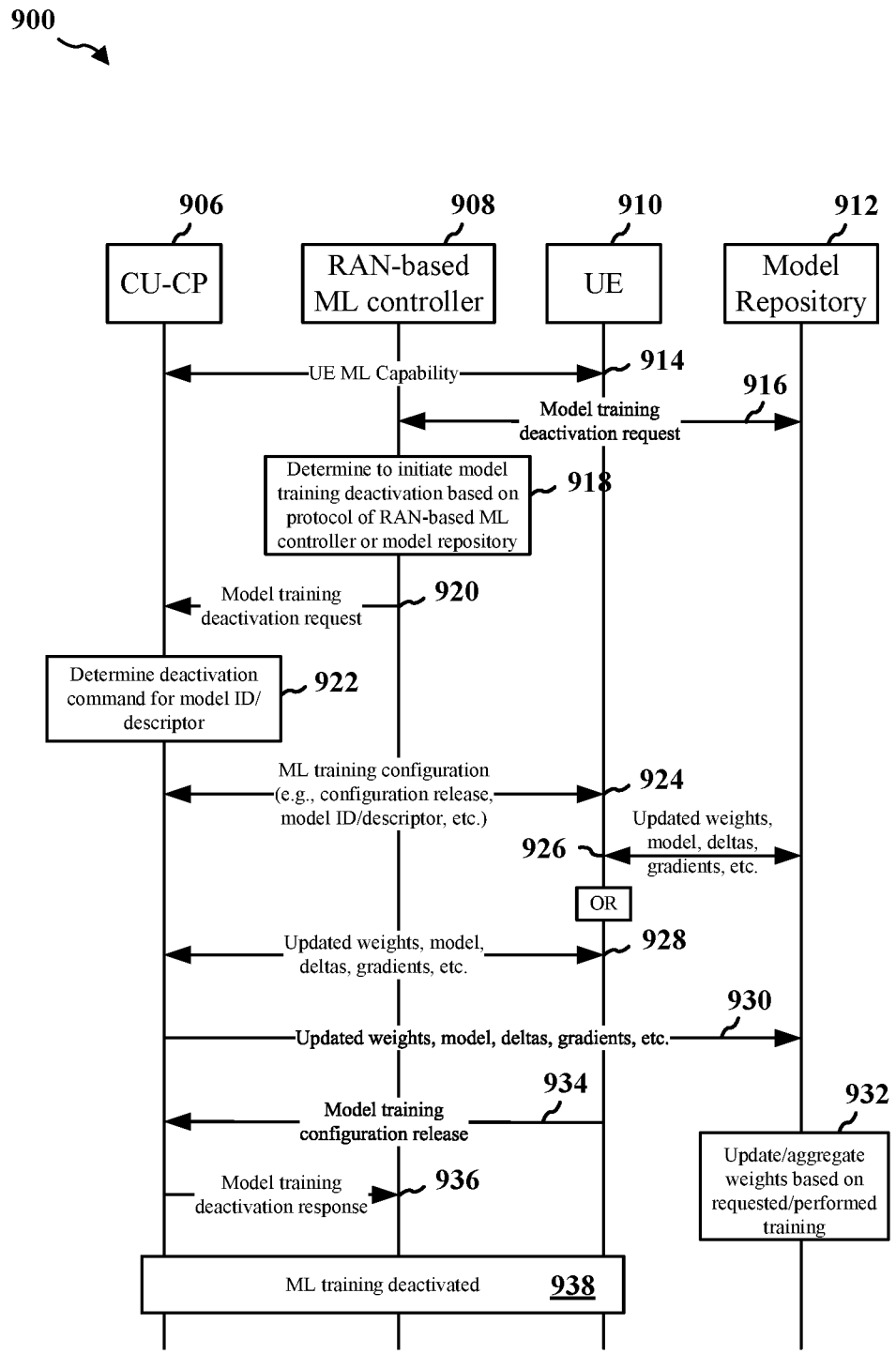
FIG. 9 is a call flow diagram for RAN-based ML controller-initiated ML model training deactivation.

FIG. 9 is a call flow diagram 900 for RAN-based ML controller-initiated ML model training deactivation. RAN-based ML controller-initiated model training deactivation may be performed in an RRC connected state. For example, the RAN-based ML controller 908 may determine, at 918, to initiate deactivation of the model training based on protocols of the RAN-based ML controller 908. The RAN-based ML controller 908 may also determine, at 918, to initiate deactivation of the model training based on the RAN-based ML controller 908 receiving, at 916, a model training deactivation request from the model repository 912. The RAN-based ML controller 908 may subsequently transmit, at 920, the model training deactivation request to the CU-CP 906, which may determine a UE ML capability indicated, at 914, from the UE 910, and a UE consent/authorization for selecting UEs for model training. The CU-CP 906 may determine, at 922, a deactivation command for the model training host based on the model ID/descriptor.

The CU-CP 906 may transmit, at 924, to the UE 910, a corresponding ML training configuration (e.g., based on a configuration release, the model ID/descriptor, etc.). The corresponding ML training configuration may be used for the UE 910 to transmit, at 926-928, the most recently updated weights, model, deltas, gradients, etc., to the model repository 912 over the u-plane, if available, or to the CU-CP 906 over the c-plane, if available. If the most recently updated weights, model, deltas, gradients, etc., are reported/transmitted, at 928, to the CU-CP 906, the CU-CP 906 may relay, at 930, the most recently updated weights, model, deltas, gradients, etc., to the model repository 912. The model repository may update/aggregate, at 932, the information based on the requested/performed model training. The UE 910 may transmit, at 934, a model training configuration release to the CU-CP 906 for deactivating the ML model training, and the CU-CP 906 may transmit, at 936, an ML training deactivation response to the RAN-based ML controller 908. The ML training may be deactivated, at 938, based on the model training configuration release and the ML training deactivation response.

Figure 10:
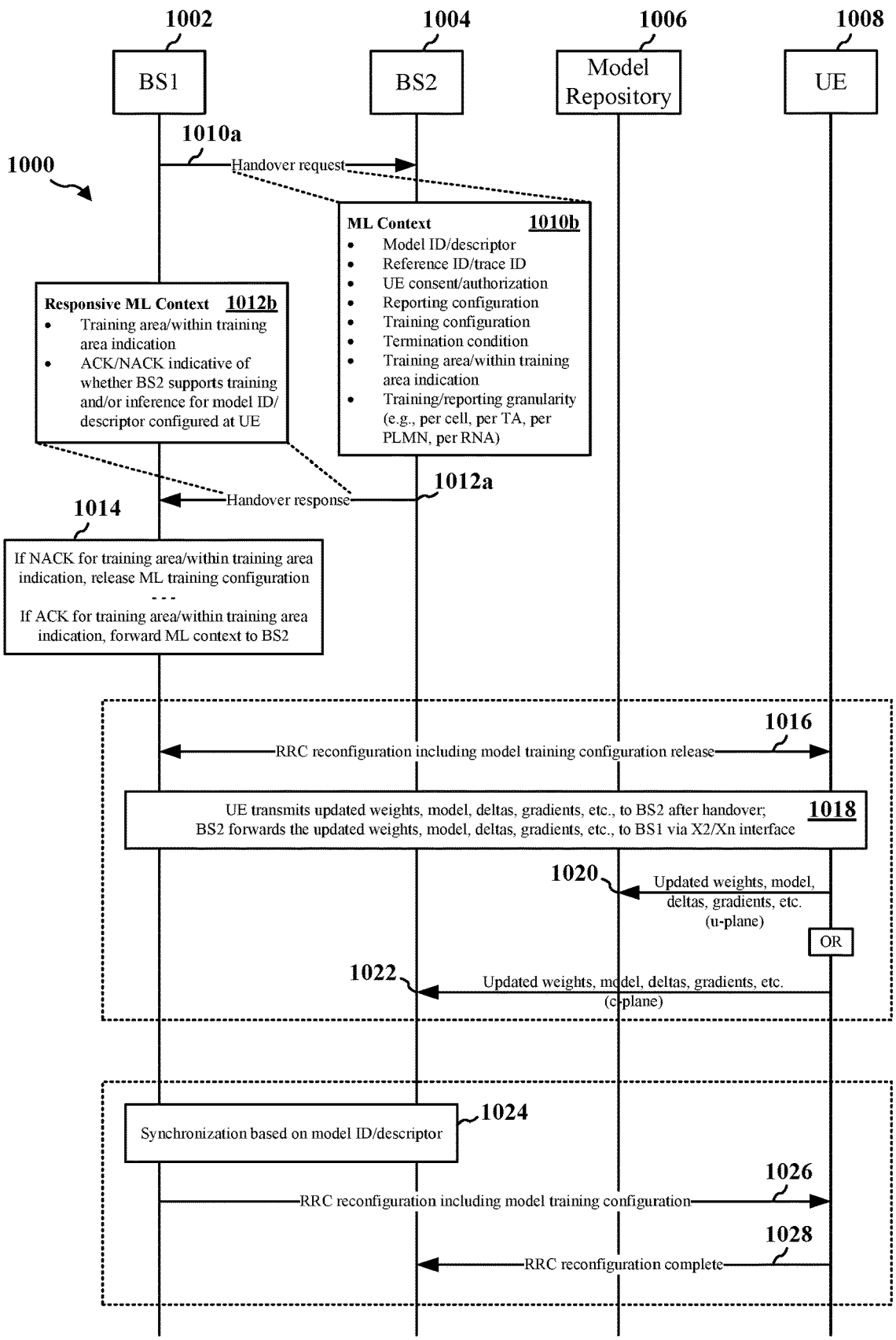
FIG. 10 is a call flow diagram for mobility-based model training.

FIG. 10 is a call flow diagram 1000 for mobility-based model training. A handover request transmitted, at 1010a, from a first base station 1002 to a second base station 1004 may include an ML context 1010b, such as a model ID/descriptor, a reference ID/trace ID, a UE consent/authorization, a reporting configuration, a training configuration, a termination condition, a training area/within training area indication, an indication of training/reporting granularity (e.g., per cell, per TA, per PLMN, per RNA), etc. A handover response transmitted, at 1012a, from the second base station 1004 to the first base station 1002 may include responsive ML context 1012b, such as the training area/within training area indication and/or ACK/NACK corresponding to whether the second base station 1004 supports training and/or inference for the model ID/descriptor configured at the UE 1008.

If the second base station 1004 does not support the training and inference for the model, or the model scope is not valid for the second base station 1004, the first base station 1002 may release the ML training configuration from the UE 1008 (e.g., based on determining, at 1014, that a NACK was received for the training area/within training area indication). That is, an RRC reconfiguration including a model training configuring release may be communicated, at 1016, to the UE 1008. At 1018, the UE 1008 may transmit the updated weights, model, deltas, gradients, etc., to the second base station 1004, and the second base station 1004 may forward, at 1018, the updated weights, model, deltas, gradients, etc., to the first base station 1002 via an X2/Xn interface.

At 1020, the UE 1008 may report the updated weights, model, deltas, gradients, etc., to the model repository 1006 over the u-plane, if available. Alternatively, the UE 1008 may report, at 1022, the updated weights, model, deltas, gradients, etc., to the second base station 1004 over the c-plane after completion of the handover to the second base station 1004, such that the second base station 1004 may forward the updated weights, model, deltas, gradients, etc., to the first base station 1002 over the X2/Xn interface, if the updated parameters are configured to be transmitted over the c-plane. In such cases, the first base station 1002 may reconfigure a model repository address via an RRC reconfiguration message.

If second base station 1004 supports the training and inference for the model, or the model scope is valid for the second base station 1004, the first base station 1002 and the second base station 1004 may exchange, at 1024, information for model synchronization (e.g., synchronization may be performed between the first base station 1002 and the second base station 1004 based on the model ID/descriptor). The first base station 1002 may forward the ML context 1010b to the second base station 1004 when the first base station 1002 receives an ACK for the training area/within training area indication. If the model is to be updated, the first base station 1002 may configure the UE 1008 to download the updated model via the second base station 1004. Thus, an RRC reconfiguration including a model training configuration may be communicated, at 1026, to the UE 1008. The UE 1008 may subsequently transmit, at 1028, an RRC reconfiguration complete message to the second base station 1004 after receiving, at 1026, the RRC reconfiguration message from the first base station 1002.

Figure 11:
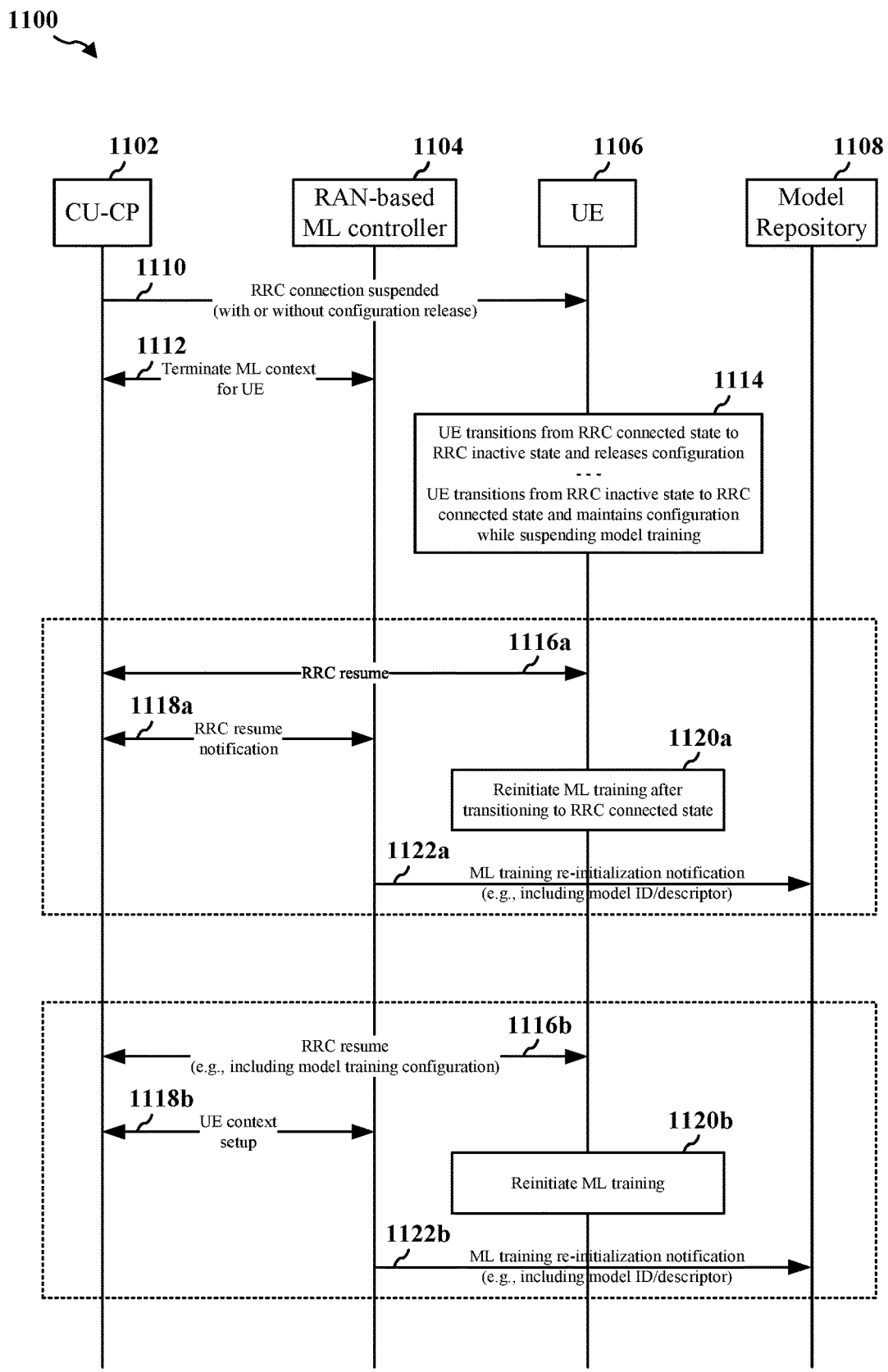
FIG. 11 is a call flow diagram for radio resource control (RRC) state transition-based model training.

FIG. 11 is a call flow diagram 1100 for RRC state transition-based model training. An RRC connection between the CU-CP 1102 and the UE 1106 may be suspended, at 1110, with or without an ML training configuration release, and an ML context for the UE 1106 may be terminated, at 1112, between the CU-CP 1102 and the RAN-based ML controller 1104. In a first aspect, the UE 1106 may transition, at 1114, from a connected state to an inactive state. In an example, the UE 1106 may release the model training configuration and the weights, model, deltas, gradients, etc., for the model training. In a further example, the UE 1106 may release the model training configuration, but transmit the updated weights, model, deltas, gradients, etc., when UE 1106 returns to the RRC connected state. The RAN-based ML controller 1104 may transmit a suspension request to the model repository 1108 for aggregation based on the model ID/descriptor. In yet a further example, when the UE 1106 transitions, at 1114, from the inactive state to the connected state, the UE 1106 may maintain the model training configuration while suspending the model training weights, model, deltas, gradients, etc.

In a second aspect, the UE 1106 may transition from the connected state to an idle state. The UE 1106 may release the model training configuration and the weights, model, deltas, gradients, etc., for the training configured for the connected state. In a third aspect, the UE 1106 may transition from an inactive state to a connected state. The CU-CP 1102 and the UE 1106 may perform, at 1116a-1116b, an RRC resume procedure, which may or may not include a model training configuration. If the RRC resume procedure includes the model training configuration (e.g., at 1116b), the CU-CP 1102 and the RAN-based ML controller 1104 may perform, at 1118*b*, a UE context setup procedure, and the UE 1106 may reinitiate, at 1120*b*, ML training. If the RRC resume procedure does not include the model training configuration (e.g., at 1116*a*), an RRC resume notification may be communicated, at 1118*a*, between the CU-CP 1102 and the RAN-based ML controller 1104, where the UE 1106 may reinitiate, at 1120*a*, ML training after transitioning to the RRC connected state from the RRC inactive state. Based on release/non-release of the configuration, the RAN-based ML controller 1104 may transmit, at 1122*a*-1122*b*, an ML training reinitialization notification/request to the model repository 1108 for aggregation, which may include the model ID/descriptor.

Figure 12:
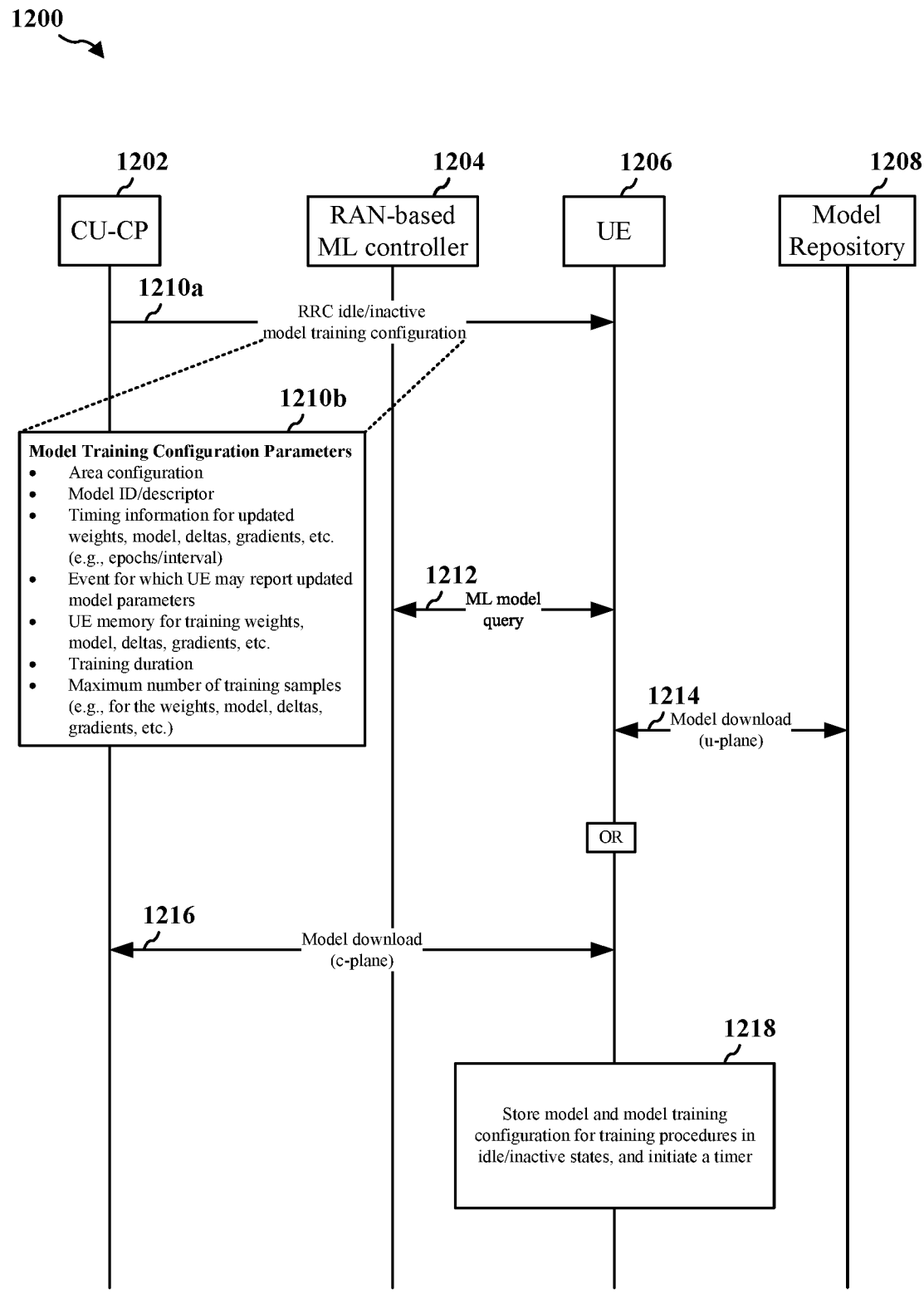
FIG. 12 is a call flow diagram for model training based on an RRC idle/inactive state.

FIG. 12 is a call flow diagram 1200 for model training based on an RRC idle/inactive state. A UE capability may be indicative of whether the UE 1206 may perform model training or inference in the RRC idle/inactive states. In configurations, separate UE capabilities may be indicated for model training or inference in the RRC idle/inactive states and the RRC connected state. The separate UE capabilities for the RRC idle/inactive states may be a subset or a reduced set of UE capabilities for model training or inference in the RRC connected state.

The CU-CP 1202 may transmit, at 1210*a*, to the UE 1206, an RRC idle/inactive model training configuration, which may include model training configuration parameters 1210*b*, such as an area configuration, a model ID/descriptor, timing information associated with the updated weights, model, deltas, gradients, etc., (e.g., epochs/interval), an event for which the UE may report updated model parameters, UE memory for training the weights, model, deltas, gradients, etc., a time duration, and/or a maximum number of training samples (e.g., for the weights, model, deltas, gradients, etc.). In the RRC idle/inactive state the UE 1206 may log the updated weights, model, deltas, gradients, etc., on a periodic basis or on an event-triggered basis. Periodic logging may be based on timing information for the model parameters and/or a most recent update to the model parameters, whereas event-based logging may be based on an event ID, timing, and/or updated weights associated with a reference model.

The UE 1206 may perform, at 1212, an ML model query procedure with the RAN-based ML controller 1204 to determine a location of the model. For example, the model may be stored at the model repository 1208 or the CU-CP 1202. The UE 1206 may either download, at 1214, the model from the model repository 1208 over the u-plane or download, at 1216, the model from the CU-CP 1202 over the c-plane based on the determined location of the model. The UE 1206 may store, at 1218, the model and the model training configuration for training procedures in the idle/inactive states (e.g., based on initiation of a timer).

If the network receives model parameters (e.g., weights) from different UEs, the network may aggregate the weights based on timing information and/or an event ID. Reporting techniques for the model parameters may be based on logged MDT, which may be associated with an RRC setup complete message, an RRC reconfiguration complete, an RRC resume complete message, an RRC reestablishment complete message, and/or the logged weights, model, deltas, gradients, etc., extracted via a UE information request and response over signaling radio bearer-2 (SRB2). The reporting techniques may also be based on quality of experience (QoE), where a report may be transmitted to the network over SRB4 when the UE 1206 transitions to the connected state (e.g., until the RRC idle/inactive state of the UE 1206 is suspended). Alternatively, the UE may send the model training results over the u-plane after returning to the CONNECTED state from the IDLE/INACTIVE state, or UE may return to the CONNECTED state from the IDLE/INACTIVE state to report the training results. Regardless of whether the UE performs the former or the later scheme for reporting of the training, the result may be determined by the UE capability.

Figure 13:
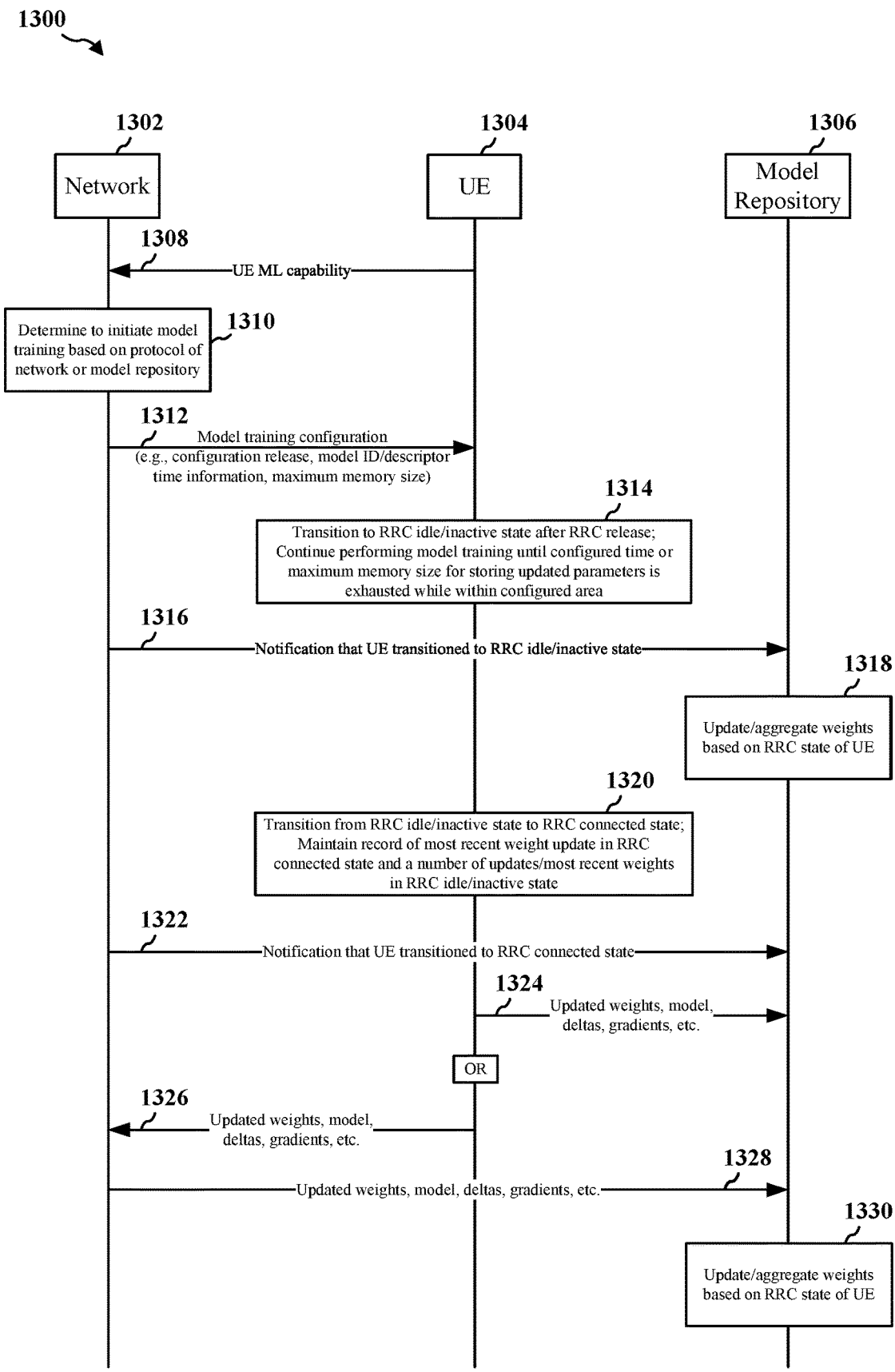
FIG. 13 is a call flow diagram for RRC agnostic model training.

FIG. 13 is a call flow diagram 1300 for RRC agnostic model training. The network 1302 (e.g., OAM or RAN-based ML controller) may configure CUs/DUs/UEs via RAN agnostic model training, which may refer to model training that occurs regardless of an RRC state. The network 1302 may receive, at 1308, a UE ML capability from the UE 1304 and determine, at 1310, to initiate model training. For example, the network 1302 may determine, at 1310, to initiate the model training based on a request from the ML server/CU-DR/model repository 1306 and/or protocols of the network 1302. Based on the determination, at 1310, to initiate model training, the network 1302 may transmit, at 1312, a model training configuration to the UE 1304. The model training configuration may include the configuration release, the model ID/descriptor, time information, a maximum memory size, a model training configuration for an RRC connected state, and/or a model training configuration for RRC idle/inactive states. The configuration for the RRC idle/inactive states may be based on a training duration in the idle/inactive and/or a maximum memory allocated for storing model training results in the idle/inactive states.

The UE may transition, at 1314, to the RRC idle/inactive states based on an RRC release. However, the UE 1304 may continue to perform, at 1314, the model training until an allocated/configured time or memory has expired. That is, a configured time or a maximum memory size for storing updated parameters may be exhausted while the UE 1304 is within a configured area. The network 1302 may notify, at 1316, the model repository 1306 when the UE 1304 transitions, at 1314, to the RRC idle/inactive states, such that the model repository 1306 may update/aggregate, at 1318, the weights based on the RRC state of the UE 1304.

The UE 1304 may store model weights to assist the model repository 1306 with aggregation after the UE 1304 transitions, at 1320, from the RRC idle/inactive states to the RRC connected state. That is, the UE 1304 may report the weights, model, deltas, gradients, etc., upon transitioning, at 1320, to the RRC connected state. The UE 1304 may maintain, at 1320, records for both a most recent weight update in the RRC connected state and a number of updates/most recent weights in the RRC idle/inactive states. The network 1302 may notify, at 1322, the ML server/model repository 1306 when the UE 1304 transitions, at 1320, to the RRC connected state from the RRC idle/inactive state. The notification may occur even if the training is performed at CUs/DUs.

The UE 1304 may transmit, at 1324, the updated weights, model, deltas, gradients, etc., to the model repository 1306 over the u-plane or to the network 1302, at 1326, over the c-plane. While the updated weights, model, deltas, gradients, etc., is being transmitted, at 1326, to the network 1302 (e.g., ML server/CU-DU/base station) in the RRC connected state, the OAM/RAN-based ML controller may configure the model repository for aggregation, at 1330, of the weights, model, deltas, gradients, etc., associated with the model training based on the RRC state of the UE 1304. If the updated weights, model, deltas, gradients, etc., are transmitted, at 1326, to the network 1302, the network 1302 may relay, at 1328, the updated weights, model, deltas, gradients, etc., to the model repository 1306. The model repository

1306 may subsequently update/aggregate, at 1330, the weights based on the RRC state of the UE 1304.

Figure 14:
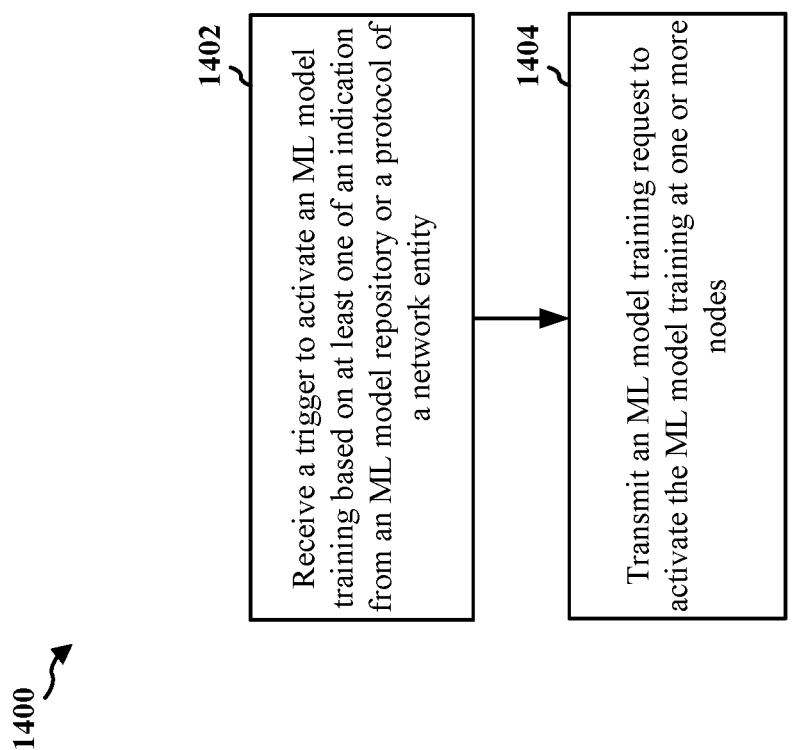
FIG. 14 is a flowchart of a method of wireless communication at a network entity (NE).

FIG. 14 is a flowchart 1400 of a method of wireless communication. The method may be performed by a network entity (e.g., core network 190, network entity 506, OAM 602/702, other network entities of the diagrams 400-1300, apparatus 2102, etc.), which may include the memory 376 and which may be the entire network entity or a component of the network entity, such as the TX processor 316, the RX processor 370, and/or the controller/processor 375.

At 1402, the network entity may receive a trigger to activate an ML model training based on at least one of an indication from the ML model repository or a protocol of a network entity. For example, referring to FIGS. 5-6, the network entity 506 may receive, at 514, a model provisioning response indicative of ML model training activation. The model training request received, at 616, by the OAM 602 may trigger ML model training activation, or the OAM 602 may determine, at 618, to initiate model training based on an internal protocol of the OAM 602. The reception, at 1402, may be performed via the model training initiator component 2140 of the apparatus 2102 in FIG. 21.

At 1404, the network entity may transmit an ML model training request to activate the ML model training at one or more nodes. For example, referring to FIGS. 5-6, the network entity 506 may transmit, at 516, a model training request to the RAN/base station 504. In the diagram 600, the OAM 602 may transmit, at 622a-622b, a UE-specific model training request 626 to the CU-CP 608, or transmit, at 624, an area-specific model training request 626 to the CU-CP 608. The transmission, at 1404, may be performed via the model training initiator component 2140 of the apparatus 2102 in FIG. 21.

Figure 15:
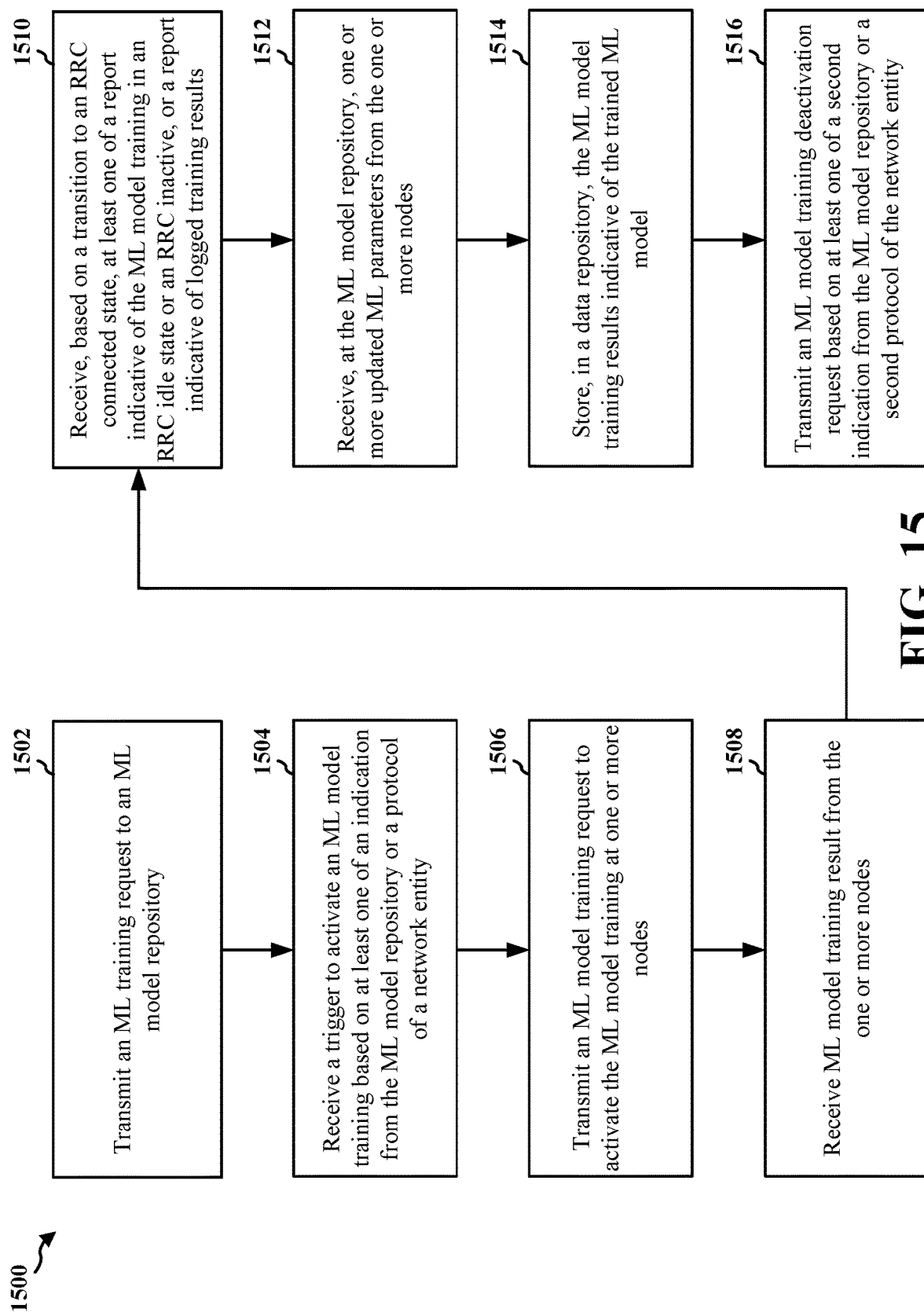
FIG. 15 is a flowchart of a method of wireless communication at an NE.

FIG. 15 is a flowchart 1500 of a method of wireless communication. The method may be performed by a network entity (e.g., core network 190, network entity 506, OAM 602/702, other network entities of the diagrams 400-1300, apparatus 2102, etc.), which may include the memory 376 and which may be the entire network entity or a component of the network entity, such as the TX processor 316, the RX processor 370, and/or the controller/processor 375.

At 1502, the network entity may transmit an ML training request to an ML model repository. For example, referring to FIG. 5, the network entity 506 may transmit, at 510, a model provisioning request to the model repository 508. The transmission, at 1502, may be performed via the model training initiator component 2140 of the apparatus 2102 in FIG. 21.

At 1504, the network entity may receive a trigger to activate an ML model training based on at least one of an indication from the ML model repository or a protocol of a network entity. For example, referring to FIGS. 5-6, the network entity 506 may receive, at 514, a model provisioning response indicative of ML model training activation. The model training request received, at 616, by the OAM 602 may trigger ML model training activation, or the OAM 602 may determine, at 618, to initiate model training based on an internal protocol of the OAM 602. The reception, at 1504, may be performed via the model training initiator component 2140 of the apparatus 2102 in FIG. 21.

At 1506, the network entity may transmit an ML model training request to activate the ML model training at one or more nodes. For example, referring to FIGS. 5-6, the network entity 506 may transmit, at 516, a model training request to the RAN/base station 504. In the diagram 600, the OAM 602 may transmit, at 622a-622b, a UE-specific model training request 626 to the CU-CP 608, or transmit, at 624, an area-specific model training request 626 to the CU-CP 608. The transmission, at 1506, may be performed via the model training initiator component 2140 of the apparatus 2102 in FIG. 21.

At 1508, the network entity may receive ML model training result from the one or more nodes. For example, referring to FIG. 5, the network entity 506 may receive, at 530a, model training results from the RAN/base station 504. The reception, at 1508, may be performed via the model training initiator component 2140 of the apparatus 2102 in FIG. 21.

At 1510, the network entity may receive, based on a transition to an RRC connected state, at least one of a report indicative of the ML model training in an RRC idle state or an RRC inactive, or a report indicative of logged training results. For example, referring to FIG. 13, an RRC idle/inactive state between the network 1302 and the UE 1304 may transition, at 1320, to an RRC connected state, where the UE 1304 may maintain records of the most recent weight update in the RRC connected state and/or a number of updates/most recent weights in the RRC idle/inactive state. The updates may be received, at 1326, by the network 1302 based on an indication from the UE 1304. The reception, at 1510, may be performed via the model training initiator component 2140 of the apparatus 2102 in FIG. 21.

At 1512, the network entity may receive, at the ML model repository, one or more updated ML parameters from the one or more nodes. For example, referring to FIGS. 5-6, the network entity 506 may receive, at 530b, in the model repository 508 the model training results from the RAN/base station 504. In the diagram 600, the updated weights, model, deltas, gradients, etc., may be received by the model repository 612, at 642, from the UE 610 or, at 646, from the CU-CP 606. The reception, at 1512, may be performed via the model training initiator component 2140 of the apparatus 2102 in FIG. 21.

At 1514, the network entity may store, in a data repository, the ML model training results indicative of the trained ML model. For example, referring to FIGS. 5-6, the network entity 506, which may include the model repository 508, may store aggregated data, at 532a-532b. In the diagram 600, the model repository 612 may update/aggregate, at 648, the weights based on the requested/performed training. The storing, at 1514, may be performed via the storage component 2142 of the apparatus 2102 in FIG. 21.

At 1516, the network entity may transmit an ML model training deactivation request based on at least one of a second indication from the ML model repository or a second protocol of the network entity. For example, referring to FIG. 7, the OAM 702 may transmit, at 720a-720b, a UE-specific model training deactivation request to the CU-CP 706, or transmit, at 722, an area-specific model training deactivation request to the CU-CP 706. The model training deactivation request may be transmitted, at 720a-722, based on the model training deactivation request indicated, at 716, from the model repository 712, or based on an internal protocol of the OAM 702. The transmission, at 1516, may be performed via the model training initiator component 2140 of the apparatus 2102 in FIG. 21.

Figure 16:
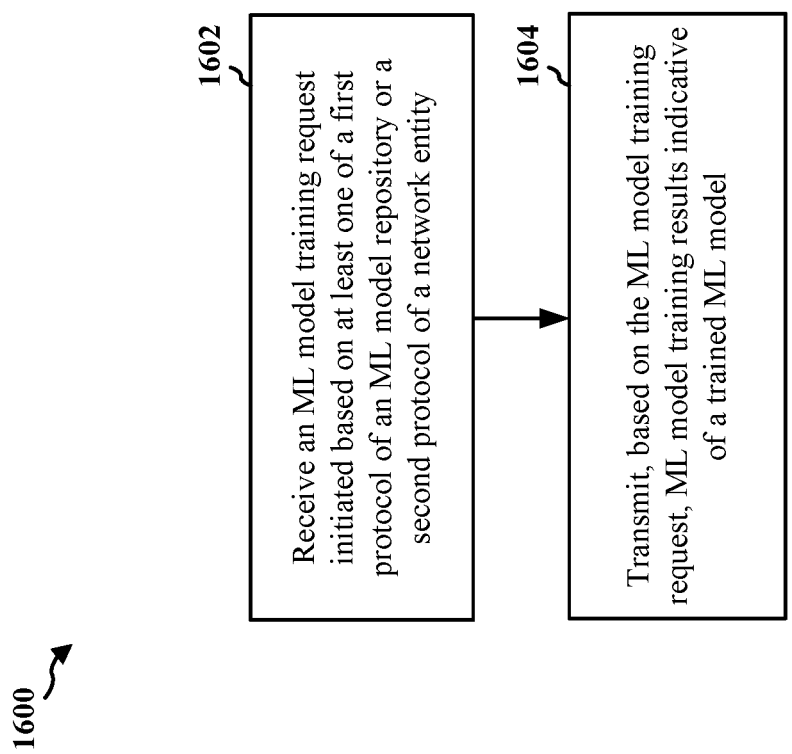
FIG. 16 is a flowchart of a method of wireless communication at a RAN.

FIG. 16 is a flowchart 1600 of a method of wireless communication. The method may be performed by a RAN (e.g., base station 102, RAN/base station 504, RAN-based ML controller 808/908, other RAN entities of the diagrams 400-1300, apparatus 2102, etc.), which may include the memory 376 and which may be the entire RAN or a component of the RAN, such as the TX processor 316, the RX processor 370, and/or the controller/processor 375.

At 1602, the RAN may receive an ML model training request initiated based on at least one of a first protocol of an ML model repository or a second protocol of a network entity. For example, referring to FIGS. 5 and 8, the RAN/base station 504 may receive, at 504, a model training request from the network entity 506. In the diagram 800, the RAN-based ML controller 808 may determine, at 818, to initiate training based on an internal protocol of the RAN-based ML controller 808 or based on a protocol of the model repository 812. The reception, at 1602, may be performed via the model training manager component 2144 of the apparatus 2102 in FIG. 21.

At 1604, the RAN may transmit, based on the ML model training request, ML model training results indicative of the trained ML model. For example, referring to FIG. 5, the RAN/base station 504 may transmit, at 530*a*, model training results to the network entity 506 based on the model training request received, at 516, from the network entity 506. The transmission, at 1604, may be performed via the model training manager component 2144 of the apparatus 2102 in FIG. 21.

Figure 17:
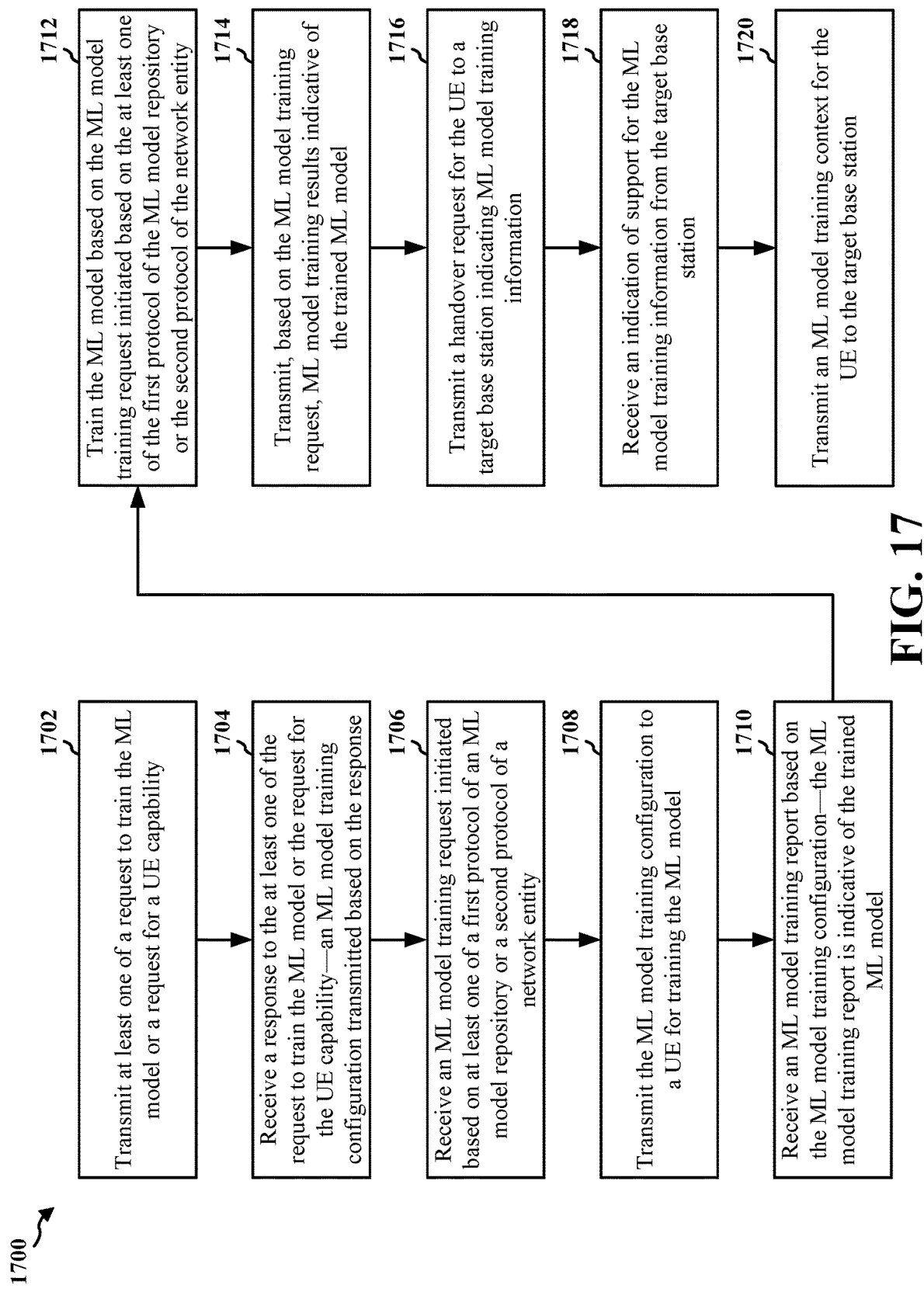
FIG. 17 is a flowchart of a method of wireless communication at a RAN.

FIG. 17 is a flowchart 1700 of a method of wireless communication. The method may be performed by a RAN (e.g., base station 102, RAN/base station 504, RAN-based ML controller 808/908, other RAN entities of the diagrams 400-1300, apparatus 2102, etc.), which may include the memory 376 and which may be the entire RAN or a component of the RAN, such as the TX processor 316, the RX processor 370, and/or the controller/processor 375.

At 1702, the RAN may transmit at least one of a request to train the ML model or a request for a UE capability. For example, referring to FIG. 8, the RAN-based ML controller 808 may transmit, at 816, a request to the model repository 812 to perform ML model training. The CU-CP 806 may transmit, at 814, a request to the UE 810 for a UE ML capability. The transmission, at 1702, may be performed via the model training manager component 2144 of the apparatus 2102 in FIG. 21.

At 1704, the RAN may receive a response to the at least one of the request to train the ML model or the request for the UE capability—an ML model training configuration transmitted based on the response. For example, referring to FIG. 8, the RAN-based ML controller 808 may receive, at 816, a model training request from the model repository 812. The CU-CP 806 may receive, at 814, an indication from the UE 810 of the UE ML capability. The reception, at 1704, may be performed via the model training manager component 2144 of the apparatus 2102 in FIG. 21.

At 1706, the RAN may receive an ML model training request initiated based on at least one of a first protocol of an ML model repository or a second protocol of a network entity. For example, referring to FIGS. 5 and 8, the RAN/base station 504 may receive, at 504, a model training request from the network entity 506. In the diagram 800, the RAN-based ML controller 808 may determine, at 818, to initiate training based on an internal protocol of the RAN-based ML controller 808 or based on a protocol of the model repository 812. The reception, at 1706, may be performed via the model training manager component 2144 of the apparatus 2102 in FIG. 21.

At 1708, the RAN may transmit the ML model training configuration to a UE for training the ML model. For example, referring to FIGS. 5 and 8, the RAN/base station 504 may transmit, at 518, a model training configuration to the UE 502. In the diagram 800, the CU-CP may transmit, at 828, an ML training configuration to the UE 810. The transmission, at 1708, may be performed via the model training manager component 2144 of the apparatus 2102 in FIG. 21.

At 1710, the RAN may receive an ML model training report based on the ML model training configuration—the ML model training report is indicative of the trained ML model. For example, referring to FIG. 5, the RAN/base station 504 may receive, at 528, a model training report from the UE 502 indicative of training performed, at 526*a*, on the ML model. The reception, at 1710, may be performed via the model training manager component 2144 of the apparatus 2102 in FIG. 21.

At 1712, the RAN may train the ML model based on the ML model training request initiated based on the at least one of the first protocol of the ML model repository or the second protocol of the network entity. For example, referring to FIG. 5, the RAN/base station 504 may perform, at 526*b*, training on the ML model based on the model training request received, at 516, from the network entity 506. The training, at 1712, may be performed via the training component 2146 of the apparatus 2102 in FIG. 21.

At 1714, the RAN may transmit, based on the ML model training request, ML model training results indicative of the trained ML model. For example, referring to FIG. 5, the RAN/base station 504 may transmit, at 530*a*, model training results to the network entity 506 based on the model training request received, at 516, from the network entity 506. The transmission, at 1714, may be performed via the model training manager component 2144 of the apparatus 2102 in FIG. 21.

At 1716, the RAN may transmit a handover request for the UE to a target base station indicating ML model training information. For example, referring to FIG. 10, the first base station 1002 may transmit, at 1010*a*, a handover request to a second base station 1004. The handover request may be indicative of ML context 1010*b*. The transmission, at 1716, may be performed via the handover component 2148 of the apparatus 2102 in FIG. 21.

At 1718, the RAN may receive an indication of support for the ML model training information from the target base station. For example, referring to FIG. 10, the first base station 1002 may receive, at 1012*a*, a handover response from the second base station 1004. The handover response may include responsive ML context 1012*b*. The reception, at 1718, may be performed via the handover component 2148 of the apparatus 2102 in FIG. 21.

At 1720, the RAN may transmit an ML model training context for the UE to the target base station. For example, referring to FIG. 10, the first base station 1002 may forward, at 1014, ML context to the second base station 1004 based on receiving an ACK in association with the handover request/response. The transmission, at 1720, may be performed via the handover component 2148 of the apparatus 2102 in FIG. 21.

Figure 18:
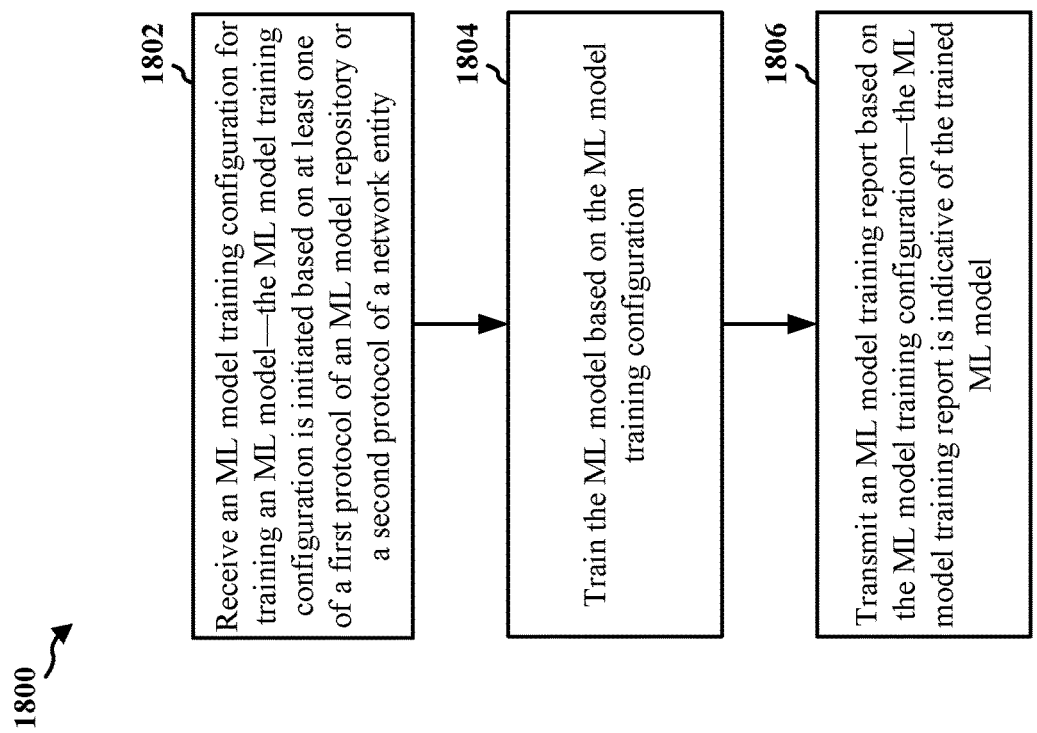
FIG. 18 is a flowchart of a method of wireless communication.

FIG. 18 is a flowchart 1800 of a method of wireless communication. The method may be performed by a UE (e.g., the UE 104, 502, 610, 710, 810, 910, 1008, 1106, 1206, 1304; other wireless communication entities of the diagrams 400-1300; the apparatus 2002; etc.), which may include the memory 360 and which may be the entire UE or a component of the UE, such as the TX processor 368, the RX processor 356, and/or the controller/processor 359.

At 1802, the UE may receive an ML model training configuration for training an ML model—the ML model training configuration is initiated based on at least one of a first protocol of an ML model repository or a second protocol of a network entity. For example, referring to FIG. 5, the UE 502 may receive, at 518, a model training configuration from the RAN/base station 504. The reception, at 1802, may be performed via the model training component 2040 of the apparatus 2002 in FIG. 20.

At 1804, the UE may train the ML model based on the ML model training configuration. For example, referring to FIGS. 5-6 and 8, the UE 502 may perform training, at 526*a*, on the ML model. In the diagrams 600/800, the UE 610/810 may update, at 640/840, model weights based on each data observation, for transmitting updated weights, model, deltas, etc., to CU-CP 606/806 or model repository 612/812 via a periodic or event-based update procedure. The training, at 1804, may be performed via the model training component 2040 of the apparatus 2002 in FIG. 20.

At 1806, the UE may transmit an ML model training report based on the ML model training configuration—the ML model training report is indicative of the trained ML model. For example, referring to FIG. 5, the UE 502 may transmit, at 528, a model training report to the RAN/base station 504 based on the model training configuration received, at 518, from the RAN/base station 504. The transmission, at 1806, may be performed via the model training component 2040 of the apparatus 2002 in FIG. 20.

Figure 19:
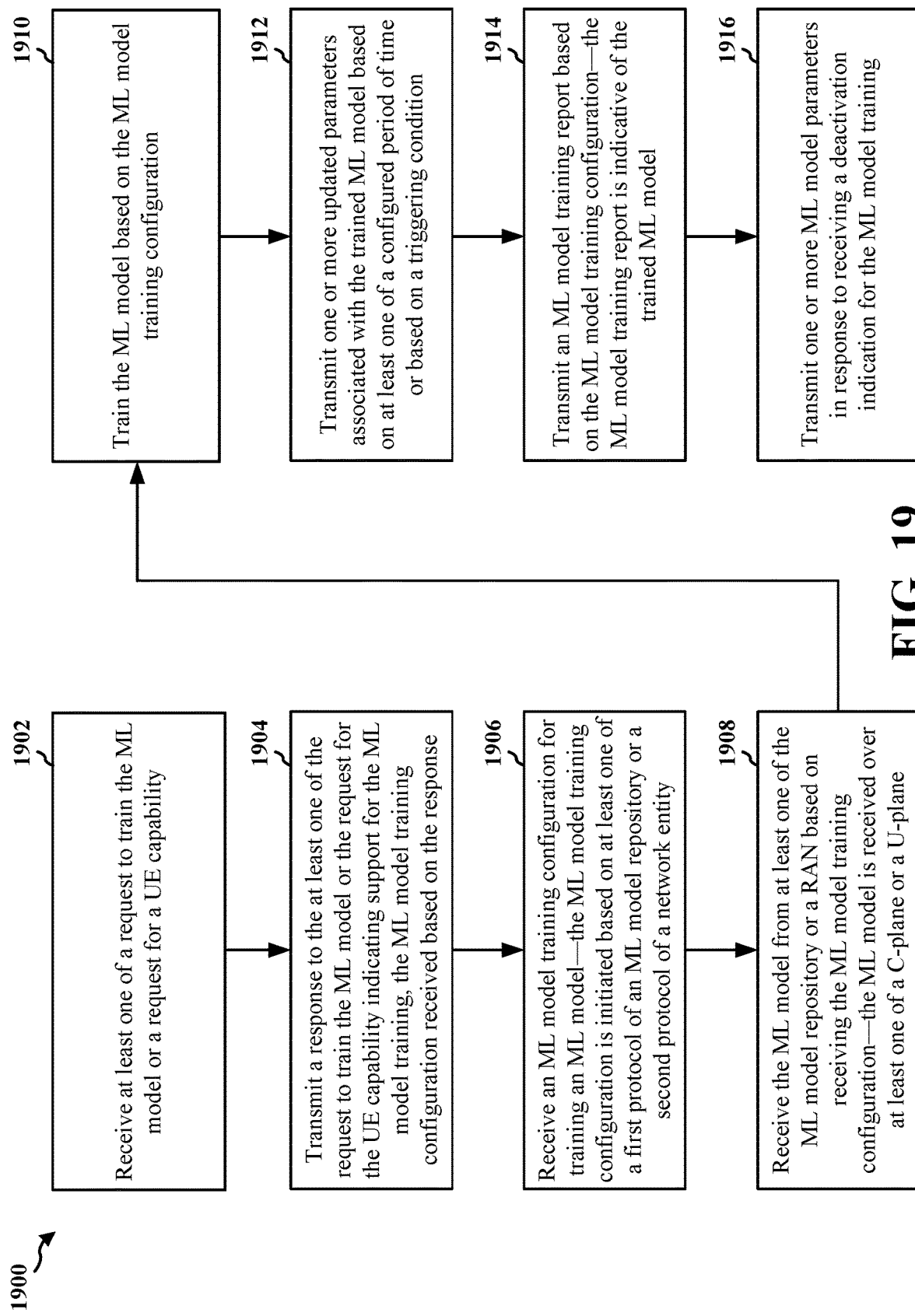
FIG. 19 is a flowchart of a method of wireless communication.

FIG. 19 is a flowchart 1900 of a method of wireless communication. The method may be performed by a UE (e.g., the UE 104, 502, 610, 710, 810, 910, 1008, 1106, 1206, 1304; other wireless communication entities of the diagrams 400-1300; the apparatus 2002; etc.), which may include the memory 360 and which may be the entire UE or a component of the UE, such as the TX processor 368, the RX processor 356, and/or the controller/processor 359.

At 1902, the UE may receive at least one of a request to train the ML model or a request for a UE capability. For example, referring to FIGS. 6 and 8, the UE 610/810 may receive, at 630/828, an ML training configuration from the CU-CP 606/806. The UE 610/810 may receive, at 614/814, a request to from the CU-CP 606/806 for a UE ML capability. The reception, at 1902, may be performed via the model training component 2040 of the apparatus 2002 in FIG. 20.

At 1904, the UE may transmit a response to the at least one of the request to train the ML model or the request for the UE capability indicating support for the ML model training, the ML model training configuration received based on the response. For example, referring to FIGS. 6 and 8, the UE 610/810 may confirm, at 630/828, the ML training configuration with the CU-CP 606/806. The UE 610/810 may transmit, at 614/814, the UE ML capability to the CU-CP 606/806. The transmission, at 1904, may be performed via the model training component 2040 of the apparatus 2002 in FIG. 20.

At 1906, the UE may receive an ML model training configuration for training an ML model—the ML model training configuration is initiated based on at least one of a first protocol of an ML model repository or a second protocol of a network entity. For example, referring to FIG. 5, the UE 502 may receive, at 518, a model training configuration from the RAN/base station 504. The reception, at 1906, may be performed via the model training component 2040 of the apparatus 2002 in FIG. 20.

At 1908, the UE may receive the ML model from at least one of the ML model repository or a RAN based on receiving the ML model training configuration—the ML model is received over at least one of a C-plane or a U-plane. For example, referring to FIGS. 5-6 and 8, the UE 502 may download, at 520, the ML model from the model repository 508 or the RAN/base station 504. In the diagrams 600/800, the UE 610/810 may download the model, at 634/834, from the model repository 612/812 via the u-plane, or download the model, at 636/836, from the CU-CP 606/806 via the c-plane. The reception, at 1908, may be performed via the model training component 2040 of the apparatus 2002 in FIG. 20.

At 1910, the UE may train the ML model based on the ML model training configuration. For example, referring to FIGS. 5-6 and 8, the UE 502 may perform training, at 526*a*, on the ML model. In the diagrams 600/800, the UE 610/810 may update, at 640/840, model weights based on each data observation, for transmitting updated weights, model, deltas, etc., to CU-CP 606/806 or model repository 612/812 via a periodic or event-based update procedure. The training, at 1910, may be performed via the model training component 2040 of the apparatus 2002 in FIG. 20.

At 1912, the UE may transmit one or more updated parameters associated with the trained ML model based on at least one of a configured period of time or based on a triggering condition. For example, referring to FIGS. 6 and 8, the UE 610/810 may transmit, at 642/842, updated weights, model, deltas, gradients, etc., to the model repository 612/812, or transmit, at 644/844, the updated weights, model, deltas, gradients, etc., to the CU-CP 606/806. The transmission, at 1912, may be performed via the model training component 2040 of the apparatus 2002 in FIG. 20.

At 1914, the UE may transmit an ML model training report based on the ML model training configuration—the ML model training report is indicative of the trained ML model. For example, referring to FIG. 5, the UE 502 may transmit, at 528, a model training report to the RAN/base station 504 based on the model training configuration received, at 518, from the RAN/base station 504. The transmission, at 1914, may be performed via the model training component 2040 of the apparatus 2002 in FIG. 20.

At 1916, the UE may transmit one or more ML model parameters in response to receiving a deactivation indication for the ML model training. For example, referring to FIGS. 7 and 9, the UE 710/910 may transmit, at 726/926, updated weights, model, deltas, gradients, etc., to the model repository 712/912, or transmit, at 728/928, the updated weights, model, deltas, gradients, etc., to the CU-CP 706/906 based on the model training deactivation request relayed from the OAM 702 or the RAN-based ML controller 908. The transmission, at 1916, may be performed via the model training component 2040 of the apparatus 2002 in FIG. 20.

Figure 20:
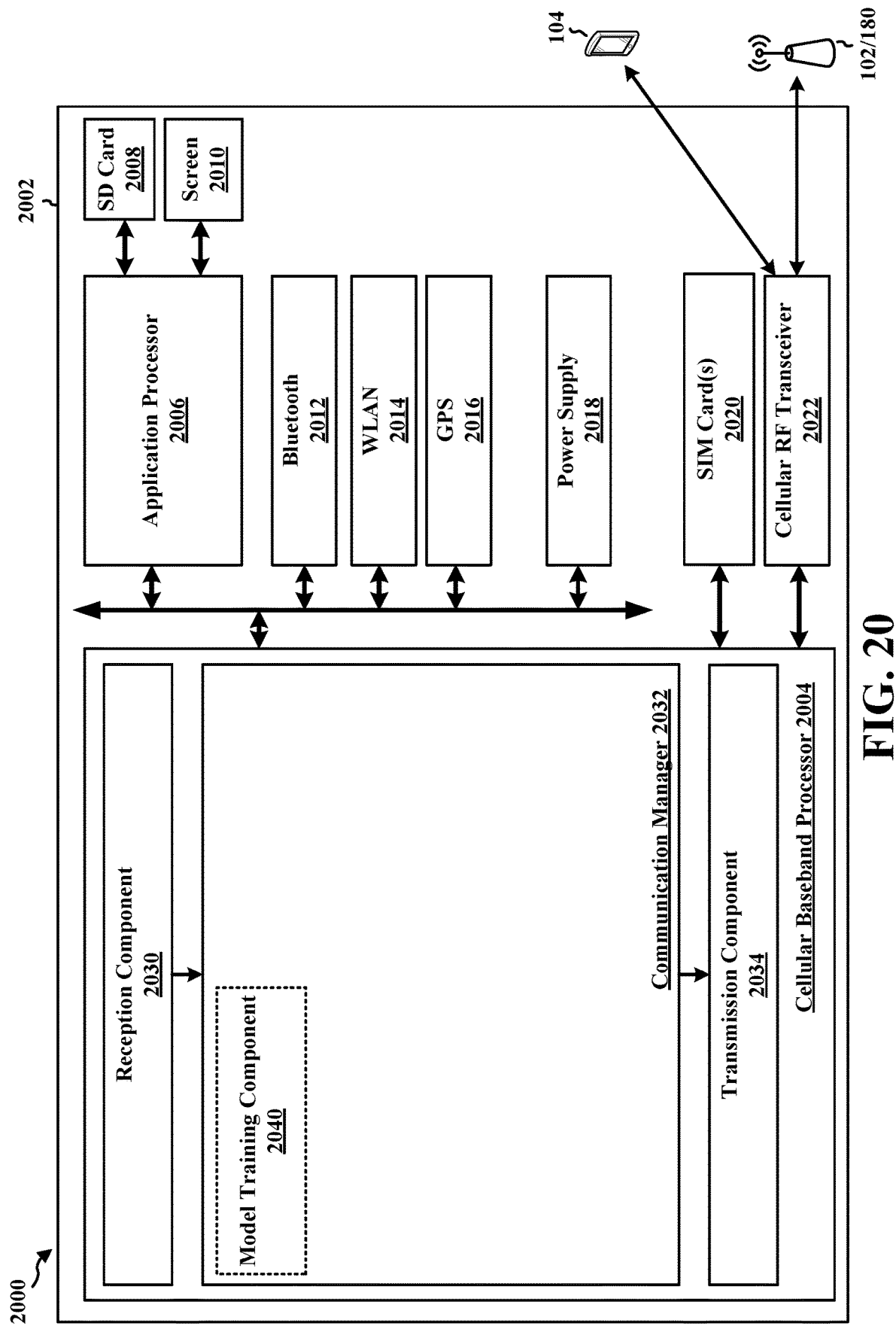
FIG. 20 is a diagram illustrating an example of a hardware implementation for an example apparatus.

FIG. 20 is a diagram 2000 illustrating an example of a hardware implementation for an apparatus 2002. The apparatus 2002 may be a UE, a component of a UE, or may implement UE functionality. In some aspects, the apparatus 2002 may include a cellular baseband processor 2004 (also referred to as a modem) coupled to a cellular RF transceiver 2022. In some aspects, the apparatus 2002 may further include one or more subscriber identity modules (SIM) cards 2020, an application processor 2006 coupled to a secure digital (SD) card 2008 and a screen 2010, a Bluetooth module 2012, a wireless local area network (WLAN) module 2014, a Global Positioning System (GPS) module 2016, or a power supply 2018. The cellular baseband processor 2004 communicates through the cellular RF transceiver 2022 with the UE 104 and/or BS 102/180. The cellular baseband processor 2004 may include a computer-readable medium/memory. The computer-readable medium/memory may be non-transitory. The cellular baseband processor 2004 is responsible for general processing, including the execution of software stored on the computer-readable medium/ memory. The software, when executed by the cellular baseband processor 2004, causes the cellular baseband processor 2004 to perform the various functions described supra. The computer-readable medium/memory may also be used for storing data that is manipulated by the cellular baseband processor 2004 when executing software. The cellular baseband processor 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the cellular baseband processor 2004. The cellular baseband processor 2004 may be a component of the UE 350 and may include the memory 360 and/or at least one of the TX processor 368, the RX processor 356, and the controller/processor 359. In one configuration, the apparatus 2002 may be a modem chip and include just the baseband processor 2004, and in another configuration, the apparatus 2002 may be the entire UE (e.g., see 350 of FIG. 3) and include the additional modules of the apparatus 2002.

The communication manager 2032 includes a model training component 2040 that is configured, e.g., as described in connection with 1802, 1902, 1906, and 1908, to receive at least one of a request to train the ML model or a request for a UE capability; to receive an ML model training configuration for training an ML model—the ML model training configuration is initiated based on at least one of a first protocol of an ML model repository or a second protocol of a network entity; and to receive the ML model from at least one of the ML model repository or a RAN based on receiving the ML model training configuration—the ML model is received over at least one of a C-plane or a U-plane. The model training component 2040 is further configured, e.g., as described in connection with 1806, 1904, 1912, 1914, and 1916, to transmit a response to the at least one of the request to train the ML model or the request for the UE capability indicating support for the ML model training, the ML model training configuration received based on the response; to transmit one or more updated parameters associated with the trained ML model based on at least one of a configured period of time or based on a triggering condition; to transmit an ML model training report based on the ML model training configuration—the ML model training report is indicative of the trained ML model; and to transmit one or more ML model parameters in response to receiving a deactivation indication for the ML model training. The model training component 2040 is further configured, e.g., as described in connection with 1804 and 1910, to train the ML model based on the ML model training configuration.

The apparatus may include additional components that perform each of the blocks of the algorithm in the flowcharts of FIGS. 18-19. As such, each block in the flowcharts of FIGS. 18-19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2002 may include a variety of components configured for various functions. In one configuration, the apparatus 2002, and in particular the cellular baseband processor 2004, includes means for receiving an ML model training configuration for training an ML model, the ML model training configuration initiated based on at least one of a first protocol of an ML model repository or a second protocol of a network entity; means for training the ML model based on the ML model training configuration; and means for transmitting an ML model training report based on the ML model training configuration, the ML model training report indicative of the trained ML model. The apparatus 2002 further includes means for receiving the ML model from at least one of the ML model repository or a RAN based on receiving the ML model training configuration, and wherein the ML model is received over at least one of a control plane or a user plane. The apparatus 2002 further includes means for transmitting one or more updated parameters associated with the trained ML model based on at least one of a configured period of time or based on a triggering condition. The apparatus 2002 further includes means for transmitting one or more ML model parameters in response to receiving the deactivation indication for the ML model training. The apparatus 2002 further includes means for receiving at least one of a request to train the ML model or a request for a UE capability; and means for transmitting a response to the at least one of the request to train the ML model or the request for the UE capability indicating support for the ML model training, the ML model training configuration received based on the response to the at least one of the request to train the ML model or the request for the UE capability.

The means may be one or more of the components of the apparatus 2002 configured to perform the functions recited by the means. As described supra, the apparatus 2002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 21:
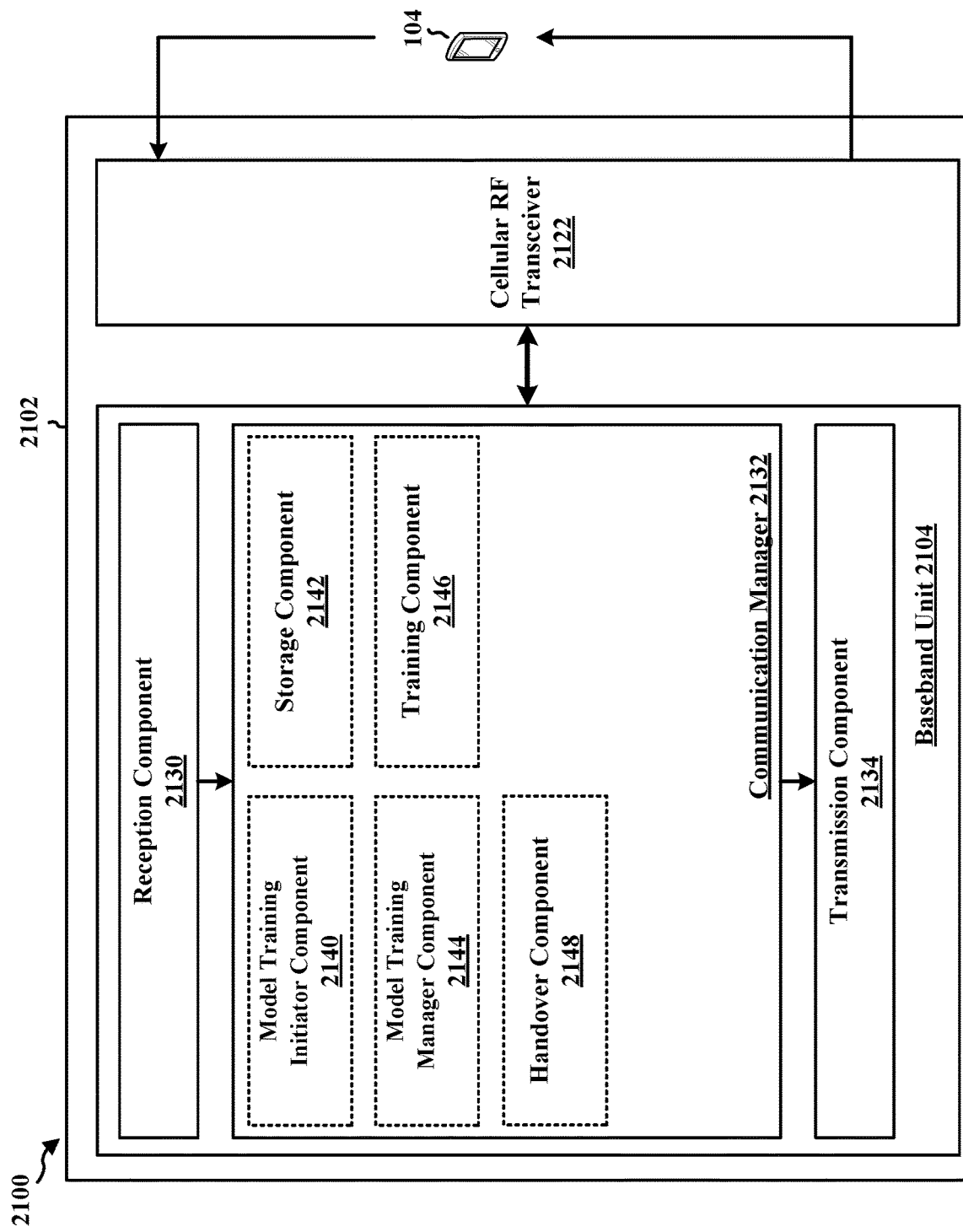
FIG. 21 is a diagram illustrating an example of a hardware implementation for an example apparatus.

FIG. 21 is a diagram 2100 illustrating an example of a hardware implementation for an apparatus 2102. The apparatus 2102 may be a base station, a component of a base station, or may implement base station functionality. In some aspects, the apparatus 2002 may include a baseband unit 2104. The baseband unit 2104 may communicate through a cellular RF transceiver 2122 with the UE 104. The baseband unit 2104 may include a computer-readable medium/memory. The baseband unit 2104 is responsible for general processing, including the execution of software stored on the computer-readable medium/memory. The software, when executed by the baseband unit 2104, causes the baseband unit 2104 to perform the various functions described supra. The computer-readable medium/memory may also be used for storing data that is manipulated by the baseband unit 2104 when executing software. The baseband unit 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the baseband unit 2104. The baseband unit 2104 may be a component of the base station 310 and may include the memory 376 and/or at least one of the TX processor 316, the RX processor 370, and the controller/processor 375.

The communication manager 2132 includes a model training initiator component 2140 that is configured, e.g., as described in connection with 1404, 1502, 1506, and 1516, to transmit an ML model training request to activate the ML model training at one or more nodes; to transmit an ML training request to an ML model repository; and to transmit an ML model training deactivation request based on at least one of a second indication from the ML model repository or a second protocol of the network entity. The model training initiator component 2140 is further configured, e.g., as described in connection with 1402, 1504, 1508, 1510, 1512, to receive a trigger to activate an ML model training based on at least one of an indication from the ML model repository or a protocol of a network entity; to receive ML model training result from the one or more nodes; to receive, based on a transition to an RRC connected state, at least one of a report indicative of the ML model training in an RRC idle state or an RRC inactive, or a report indicative of logged training results; and to receive, at the ML model repository, one or more updated ML parameters from the one or more nodes. The communication manager 2132 further includes a storage component 2142 that is configured, e.g., as described in connection with 1514, to store, in a data repository, the ML model training results indicative of the trained ML model.

The communication manager 2132 further includes a model training manager component 2144 that is configured, e.g., as described in connection with 1604, 1702, 1708, and 1714, to transmit, based on the ML model training request, ML model training results indicative of a trained ML model; to transmit at least one of a request to train the ML model or a request for a UE capability; and to transmit the ML model training configuration to a UE for training the ML model. The model training manager component 2144 is further configured, e.g., as described in connection with 1602, 1704, 1706, and 1710, to receive an ML model training request initiated based on at least one of a first protocol of an ML model repository or a second protocol of a network entity; to receive a response to the at least one of the request to train the ML model or the request for the UE capability—an ML model training configuration transmitted based on the response; and to receive an ML model training report based on the ML model training configuration—the ML model training report is indicative of the trained ML model.

The communication manager 2132 further includes a training component 2146 that is configured, e.g., as described in connection with 1712, to train the ML model based on the ML model training request initiated based on the at least one of the first protocol of the ML model repository or the second protocol of the network entity. The communication manager 2132 further includes a handover component 2148 that is configured, e.g., as described in connection with 1716, 1718, and 1720, to transmit a handover request for the UE to a target base station indicating ML model training information; to receive an indication of support for the ML model training information from the target base station; and to transmit an ML model training context for the UE to the target base station.

The apparatus may include additional components that perform each of the blocks of the algorithm in the flowcharts of FIGS. 14-17. As such, each block in the flowcharts of FIGS. 14-17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2102 may include a variety of components configured for various functions. In one configuration, the apparatus 2102, and in particular the baseband unit 2104, includes means for receiving a trigger to activate an ML model training based on at least one of an indication from an ML model repository or a protocol of the network entity; and means for transmitting an ML model training request to activate the ML model training at one or more nodes. The apparatus 2102 further includes means for transmitting an ML training request to the ML model repository. The apparatus 2102 further includes means for transmitting an ML model training deactivation request based on at least one of a second indication from the ML model repository or a second protocol of the network entity. The apparatus 2102 further includes means for receiving ML model training result from the one or more nodes; and means for storing, in a data repository, the ML model training results indicative of the trained ML model. The apparatus 2102 further includes means for receiving, based on a transition to an RRC connected state, at least one of a report indicative of the ML model training in an RRC idle state or an RRC inactive, or a report indicative of logged training results. The apparatus 2102 further includes means for receiving, at the ML model repository, one or more updated ML parameters from the one or more nodes.

The means may be one or more of the components of the apparatus 2102 configured to perform the functions recited by the means. As described supra, the apparatus 2102 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at an NE including at least one processor coupled to a memory and configured to: receive a trigger to activate an ML model training based on at least one of an indication from an ML model repository or a protocol of the network entity; and transmit an ML model training request to activate the ML model training at one or more nodes.

Aspect 2 may be combined with aspect 1 and includes that the ML model training request includes at least one of a UE-specific configuration for ML model training or an area-specific configuration for ML model training.

Aspect 3 may be combined with any of aspects 1-2 and includes that the ML model training request is directed to one or more of a UE, a base station, a DU, or a CU.

Aspect 4 may be combined with any of aspects 1-3 and includes that the ML model training request indicates at least one of a model ID, a model descriptor, a reference ID, a trace ID, a reporting configuration, a training configuration, a termination condition, a training area, a training granularity, or a reporting granularity.

Aspect 5 may be combined with any of aspects 1-4 and includes that the ML model training request is transmitted based on the indication from the ML model repository, the at least one processor further configured to transmit an ML training request to the ML model repository.

Aspect 6 may be combined with any of aspects 1-5 and includes that the ML training response includes a configuration for at least one of an ML model weight, an ML model rule, an ML delta parameter, or an ML gradient parameter.

Aspect 7 may be combined with any of aspects 1-6 and includes that the at least one processor is further configured to transmit an ML model training deactivation request based on at least one of a second indication from the ML model repository or a second protocol of the network entity.

Aspect 8 may be combined with any of aspects 1-7 and includes that the network entity corresponds to at least one of an OAM entity, a RAN-based ML controller, or an NWDAF.

Aspect 9 may be combined with any of aspects 1-8 and includes that the network entity transmits the ML model training request to a UE in an RRC connected state.

Aspect 10 may be combined with any of aspects 1-9 and includes that the trigger includes a resumption of an RRC connected state for a UE, and the ML model training request includes a reinitialization notification.

Aspect 11 may be combined with any of aspects 1-10 and includes that the ML model training request is for the one or more nodes in an RRC idle state or an RRC inactive state.

Aspect 12 may be combined with any of aspects 1-11 and includes that the ML model training request is common to an RRC connected state and an RRC idle state or an RRC inactive state.

Aspect 13 may be combined with any of aspects 1-12 and includes that the at least one processor is further configured to: receive ML model training result from the one or more nodes; and store, in a data repository, the ML model training results indicative of the trained ML model.

Aspect 14 may be combined with any of aspects 1-13 and includes that the at least one processor is further configured to receive, based on a transition to an RRC connected state, at least one of a report indicative of the ML model training in an RRC idle state or an RRC inactive, or a report indicative of logged training results.

Aspect 15 may be combined with any of aspects 1-14 and includes that the ML model training results indicative of the trained ML model are stored in the data repository in association with other ML model training results.

Aspect 16 may be combined with any of aspects 1-15 and includes that the at least one processor is further configured to receive, at the ML model repository, one or more updated ML parameters from the one or more nodes.

Aspect 17 is an apparatus for wireless communication at a RAN including at least one processor coupled to a memory and configured to: receive an ML model training request initiated based on at least one of a first protocol of an ML model repository or a second protocol of a network entity; and transmit, based on the ML model training request, ML model training results indicative of a trained ML model.

Aspect 18 may be combined with aspect 17 and includes that the at least one processor is further configured to train the ML model based on the ML model training request initiated based on the at least one of the first protocol of the ML model repository or the second protocol of a network entity.

Aspect 19 may be combined with any of aspects 17-18 and includes that the at least one processor is further configured to: transmit an ML model training configuration to a UE for training the ML model; and receive an ML model training report based on the ML model training configuration, the ML model training report indicative of the trained ML model.

Aspect 20 may be combined with any of aspects 17-19 and includes that the at least one processor is further configured to: transmit at least one of a request to train the ML model or a request for a UE capability; and receive a response to the at least one of the request to train the ML model or the request for the UE capability, the ML model training configuration transmitted based on the response to the at least one of the request to train the ML model or the request for the UE capability.

Aspect 21 may be combined with any of aspects 17-20 and includes that the at least one processor is further configured to: transmit a handover request for the UE to a target base station indicating ML model training information; receive an indication of support for the ML model training information from the target base station; and transmit an ML model training context for the UE to the target base station.

Aspect 22 may be combined with any of aspects 17-21 and includes that the RAN transmits the ML model training configuration to the UE in response to an RRC state transition for the UE.

Aspect 23 is an apparatus for wireless communication including at least one processor coupled to a memory and configured to: receive an ML model training configuration for training an ML model, the ML model training configuration initiated based on at least one of a first protocol of an ML model repository or a second protocol of a network entity; train the ML model based on the ML model training configuration; and transmit an ML model training report based on the ML model training configuration, the ML model training report indicative of the trained ML model.

Aspect 24 may be combined with aspect 23 and includes that the ML model training request indicates at least one of a model ID, a model descriptor, a reference ID, a trace ID, a reporting configuration, a training configuration, a termination condition, a training area, a training granularity, or a reporting granularity.

Aspect 25 may be combined with any of aspects 23-24 and includes that the at least one processor is further configured to receive the ML model from at least one of the ML model repository or a RAN based on receiving the ML model training configuration, and where the ML model is received over at least one of a control plane or a user plane.

Aspect 26 may be combined with any of aspects 23-25 and includes that the at least one processor is further configured to transmit one or more updated parameters associated with the trained ML model based on at least one of a configured period of time or based on a triggering condition.

Aspect 27 may be combined with any of aspects 23-26 and includes that the triggering condition includes a deactivation indication, where the at least one processor is further configured to: transmit one or more ML model parameters in response to receiving the deactivation indication for the ML model training.

Aspect 28 may be combined with any of aspects 23-27 and includes that the at least one processor is further configured to: receive at least one of a request to train the ML model or a request for a UE capability; and transmit a response to the at least one of the request to train the ML model or the request for the UE capability indicating support for the ML model training, the ML model training configuration received based on the response to the at least one of the request to train the ML model or the request for the UE capability.

Aspect 29 may be combined with any of aspects 23-28 and includes that the apparatus is a UE, and where the UE receives the ML model training configuration from a first base station and transmits the ML model training report to a second base station after a handover from the first base station to the second base station.

Aspect 30 may be combined with any of aspects 23-29 and includes that the apparatus is a UE that receives the ML model training configuration in response to an RRC state transition.

Aspect 31 is a method of wireless communication for implementing any of aspects 1-30.

Aspect 32 is an apparatus for wireless communication including means for implementing any of aspects 1-30.

Aspect 33 is a computer-readable medium storing computer executable code, the code when executed by at least one processor causes the at least one processor to implement any of aspects 1-30.

What is claimed is:

1. An apparatus for wireless communication at a network entity, comprising:
   memory; and
   at least one processor coupled to the memory and configured to:
      receive a trigger to activate a machine learning (ML) model training based on at least one of an indication from an ML model repository or a protocol of the network entity; and
      transmit an ML model training request to activate the ML model training at one or more nodes.

2. The apparatus of claim 1, wherein the ML model training request comprises at least one of a user equipment (UE)-specific configuration for the ML model training or an area-specific configuration for the ML model training.

3. The apparatus of claim 1, wherein the ML model training request is directed to one or more of a user equipment (UE), a base station, a distributed unit (DU), or a central unit (CU).

4. The apparatus of claim 1, wherein the ML model training request indicates at least one of a model identifier (ID), a model descriptor, a reference ID, a trace ID, a reporting configuration, a training configuration, a termination condition, a training area, a training granularity, or a reporting granularity.

5. The apparatus of claim 1, wherein to transmit the ML model training request, the at least one processor is configured to transmit the ML model training request based on the indication from the ML model repository, and wherein the at least one processor further configured to transmit an ML training request to the ML model repository.

6. The apparatus of claim 5, wherein an ML model training response to the ML model training request comprises a configuration for at least one of an ML model weight, an ML model rule, an ML delta parameter, or an ML gradient parameter.

7. The apparatus of claim 1, wherein the at least one processor is further configured to transmit an ML model training deactivation request based on at least one of a second indication from the ML model repository or a second protocol of the network entity.

8. The apparatus of claim 1, wherein the network entity corresponds to at least one of an operations administration and maintenance (OAM) entity, a radio access network (RAN)-based ML controller, or a network data analytics function (NWDAF).

9. The apparatus of claim 1, wherein the at least one processor is further configured to transmit the ML model training request to a user equipment (UE) in a radio resource control (RRC) connected state.

10. The apparatus of claim 1, wherein the trigger includes a resumption of an RRC connected state for a user equipment (UE), and the ML model training request comprises a reinitialization notification.

11. The apparatus of claim 1, wherein the ML model training request is for the one or more nodes in a radio resource control (RRC) idle state or an RRC inactive state.

12. The apparatus of claim 1, wherein the ML model training request is common to a radio resource control (RRC) connected state and an RRC idle state or an RRC inactive state.

13. The apparatus of claim 1, wherein the at least one processor is further configured to:
   receive at least one ML model training result from the one or more nodes; and
   store, in a data repository, the at least one ML model training result indicative of a trained ML model.

14. The apparatus of claim 13, wherein the at least one processor is further configured to receive, based on a transition to a radio resource control (RRC) connected state, at least one of a first report indicative of the ML model training in an RRC idle state or an RRC inactive state, or a second report indicative of logged training results.

15. The apparatus of claim 13, wherein to store the at least one ML model training result indicative of the trained ML model, the at least one processor is configured to store the at least one ML model training result indicative of the trained ML model in the data repository in association with other ML model training results.

16. The apparatus of claim 13, wherein the at least one processor is further configured to receive, at the ML model repository, one or more updated ML parameters from the one or more nodes.

17. An apparatus for wireless communication at a radio access network (RAN), comprising:
 memory; and
 at least one processor coupled to the memory and configured to:
  receive a machine learning (ML) model training request initiated based on at least one of a first protocol of an ML model repository or a second protocol of a network entity; and
  transmit, based on the ML model training request, ML model training results indicative of a trained ML model.

18. The apparatus of claim 17, wherein the at least one processor is further configured to train an ML model based on the ML model training request initiated based on the at least one of the first protocol of the ML model repository or the second protocol of the network entity.

19. The apparatus of claim 17, wherein the at least one processor is further configured to:
 transmit an ML model training configuration to a user equipment (UE) for training an ML model; and
 receive an ML model training report based on the ML model training configuration, the ML model training report indicative of the trained ML model.

20. The apparatus of claim 19, wherein the at least one processor is further configured to:
 transmit at least one of a first request to train the ML model or a second request for a UE capability; and
 receive a response to the at least one of the first request to train the ML model or the second request for the UE capability, wherein to transmit the ML model training configuration, the at least one processor is configured to transmit the ML model training configuration based on the response to the at least one of the first request to train the ML model or the second request for the UE capability.

21. The apparatus of claim 19, wherein the at least one processor is further configured to:
 transmit a handover request for the UE to a target base station indicating ML model training information;
 receive an indication of support for the ML model training information from the target base station; and
 transmit an ML model training context for the UE to the target base station.

22. The apparatus of claim 19, wherein the at least one processor is further configured to transmit the ML model training configuration to the UE in response to a radio resource control (RRC) state transition for the UE.

23. An apparatus for wireless communication, comprising:
 memory; and
 at least one processor coupled to the memory and configured to:
  receive a machine learning (ML) model training configuration for training an ML model, the ML model training configuration initiated based on a ML model training request of at least one of a first protocol of an ML model repository or a second protocol of a network entity;
  train the ML model based on the ML model training configuration; and
  transmit an ML model training report based on the ML model training configuration, the ML model training report indicative of a trained ML model.

24. The apparatus of claim 23, wherein the ML model training request associated with the ML model training configuration indicates at least one of a model identifier (ID), a model descriptor, a reference ID, a trace ID, a reporting configuration, a training configuration, a termination condition, a training area, a training granularity, or a reporting granularity.

25. The apparatus of claim 23, wherein the at least one processor is further configured to receive the ML model from at least one of the ML model repository or a radio access network (RAN) based on the ML model training configuration, and wherein to receive the ML model, the at least one processor is configured to receive the ML model over at least one of a control plane (C-plane) or a user plane (U-plane).

26. The apparatus of claim 23, wherein the at least one processor is further configured to transmit one or more updated parameters associated with the trained ML model based on at least one of a configured period of time or based on a triggering condition.

27. The apparatus of claim 26, wherein the triggering condition comprises a deactivation indication, wherein the at least one processor is further configured to:
 transmit one or more ML model parameters in response to a reception of the deactivation indication for training the ML model.

28. The apparatus of claim 23, wherein the at least one processor is further configured to:
 receive at least one of a first request to train the ML model or a second request for a UE capability; and
 transmit a response to the at least one of the first request to train the ML model or the second request for the UE capability indicating support for ML model training, wherein to receive the ML model training configuration, the at least one processor is configured to receive the ML model training configuration based on the response to the at least one of the first request to train the ML model or the second request for the UE capability.

29. The apparatus of claim 23, wherein the apparatus is a user equipment (UE), and wherein to receive the ML model training configuration, the at least one processor is configured to receive the ML model training configuration from a first base station, and wherein to transmit the ML model training report, the at least one processor is configured to transmit the ML model training report to a second base station after a handover from the first base station to the second base station.

30. The apparatus of claim 23, wherein the apparatus is a user equipment (UE), and wherein to receive the ML model training configuration, the at least one processor is configured to receive the ML model training configuration in response to a radio resource control (RRC) state transition.

* * * * *